(12) United States Patent
Myers et al.

(10) Patent No.: US 11,620,485 B2
(45) Date of Patent: Apr. 4, 2023

(54) DEVICE AND/OR METHOD FOR ADAPTIVE COMPUTATION

(71) Applicant: Arm Limited, Cambridge (GB)

(72) Inventors: James Edward Myers, Bottisham (GB); Ludmila Cherkasova, Sunnyvale, CA (US); Parameshwarappa Anand Kumar Savanth, Cambridge (GB); Sahan Sajeewa Hiniduma Udugama Gamage, Cambridge (GB); Mbou Eyole, Soham (GB)

(73) Assignee: Arm Limited, Cambridge (GB)

( * ) Notice: Subject to any disclaimer, the term of this patent is extended or adjusted under 35 U.S.C. 154(b) by 79 days.

(21) Appl. No.: 16/898,085

(22) Filed: Jun. 10, 2020

(65) Prior Publication Data
US 2021/0390360 A1 Dec. 16, 2021

(51) Int. Cl.
*G06K 19/07* (2006.01)

(52) U.S. Cl.
CPC ................. *G06K 19/0709* (2013.01)

(58) Field of Classification Search
CPC .................................................. G06K 19/0709
USPC ........................................................ 235/492
See application file for complete search history.

(56) References Cited

U.S. PATENT DOCUMENTS

| | | | |
|---|---|---|---|
| 7,170,201 B2 | 1/2007 | Hamel et al. | |
| 7,521,890 B2 | 4/2009 | Lee et al. | |
| 8,937,893 B1 | 1/2015 | Nemavat | |
| 9,030,321 B2 | 5/2015 | Breed | |
| 9,846,479 B1 | 12/2017 | Brown et al. | |
| 10,922,939 B1* | 2/2021 | Shakedd | H04L 9/14 |
| 10,936,927 B2 | 3/2021 | Sundaresan et al. | |
| 10,939,471 B2 | 3/2021 | Newman et al. | |
| 2004/0201539 A1* | 10/2004 | Yewen | H01Q 1/2216 |
| | | | 343/742 |
| 2008/0150698 A1* | 6/2008 | Smith | G06K 19/0723 |
| | | | 340/10.4 |
| 2010/0052215 A1 | 3/2010 | Emond et al. | |

(Continued)

FOREIGN PATENT DOCUMENTS

| | | |
|---|---|---|
| GB | 2535165 A | 8/2016 |
| WO | 2014058473 A1 | 4/2014 |
| WO | 2019020974 A1 | 1/2019 |

OTHER PUBLICATIONS

Notification of Transmittal of the International Search Report and the Written Opinion of the International Searching Authority, or the Declaration, App. No. PCT/EP2021/025196, dated Sep. 7, 2021, 1 Page.

(Continued)

*Primary Examiner* — Michael G Lee
*Assistant Examiner* — David Tardif
(74) *Attorney, Agent, or Firm* — Berkeley Law & Technology Group, LLP

(57) ABSTRACT

Disclosed are methods, systems and devices for varying operations of a transponder device based, at least in part, on an availability of energy and/or power that may be harvested and/or collected. In one particular implementation, operations to generate one or more signals from sensor circuitry and/or to perform computations may be varied based, at least in part, on an availability of harvestable and/or collectable energy and/or power.

18 Claims, 9 Drawing Sheets

(56) References Cited

U.S. PATENT DOCUMENTS

| | | | |
|---|---|---|---|
| 2012/0019363 A1* | 1/2012 | Fein | G06K 19/07767 340/10.1 |
| 2012/0256492 A1 | 10/2012 | Song et al. | |
| 2014/0097944 A1 | 4/2014 | Fastert et al. | |
| 2021/0286958 A1 | 9/2021 | Myers et al. | |

OTHER PUBLICATIONS

International Search Report, App. No. PCT/EP2021/025196, dated Sep. 7, 2021, 6 Pages.

Written Opinion of the International Searching Authority, App. No. PCT/EP2021/025196, dated Sep. 7, 2021, 9 Pages.

Notification of Transmittal of the International Search Report and the Written Opinion of the International Searching Authority, or the Declaration, App. No. PCT/EP2021/025099, dated Jun. 10, 2021, 1 Page.

International Search Report, App. No. PCT/EP2021/025099, dated Jun. 10, 2021, 4 Pages.

Written Opinion of the International Searching Authority, App. No. PCT/EP2021/025099, dated Jun. 10, 2021, 9 Pages.

Balsamo, et al, "Hibernus ++: A Self-Calibrating and Adaptive System for Transiently-Powered Embedded Devices," IEEE Transactions on Computer-Aided Design of Integrated Circuits and Systems, vol. 35, No. 12, Dec. 2016, 13 Pages.

Colin, et al, "A Reconfigurable Energy Storage Architecture for Energy-harvesting Devices," ASPLOS '18, Mar. 24-28, 2018, ACM ISBN 978-1-4503-4911-6/18/03, 15 Pages.

Colin, et al, "Chain: Tasks and Channels for Reliable Intermittent Programs," https://duckduckgo.com/?q=Chain%3A+Tasks+and+C hannels+for+Reliable+Intermittent+Programs&atb=v262-1&ia= web, 17 Pages.

Hester, et al, "New Directions: The Future of Sensing is Batteryless, Intermittent, and Awesome," https://duckduckgo.com/?q-New+ Directions%3A+The+Future+of+Sensing+is+Batteryless%2C+ Intermittent%2C+and+Awesome&atb=v262-1&ia=web, 6 Pages.

Maeng, et al, "Alpaca: Intermittent Execution without Checkpoints," arXv:1909.06951v1 [cs.DC] Sep. 13, 2019, 26 Pages.

Office Action, U.S. Appl. No. 16/817,496, dated Apr. 14, 2021, 11 Pages.

Response to Office Action, U.S. Appl. No. 16/817,496, filed Jul. 14, 2021, 14 Pages.

Notice of Allowance, U.S. Appl. No. 16/817,496, dated Aug. 11, 2021, 8 Pages.

Notification of Transmittal of the International Search Report and the Written Opinion of the International Searching Authority, or the Declaration, App. No. PCT/GB2018/052035, Filed Jul. 18, 2018, dated Oct. 15, 2018, 1 Page.

International Search Report, App. No. PCT/GB2018/052035, Filed Jul. 18, 2018, dated Oct. 15, 2018, 4 Pages.

Written Opinion of the International Searching Authority, App. No. PCT/GB2018/052035, Filed Jul. 18, 2018, dated Oct. 15, 2018, 7 Pages.

Combined Search and Examination Report under Sections 17 and 18(3), App. No. GB1712048.6, dated Jan. 29, 2018, 6 Pages.

Smits, et al, "Development of printed RFID sensor tags for smart food packaging," IMCS 2012—The 14th International Meeting on Chemical Sensors, DOI 10.5162/IMCS2012/4.5.2, 4 Pages.

Quintero, et al, "Smart RFID label with printed multisensor platform for environmental monitoring," 2016 IOP Publishing Ltd, DOI: 10.1088/2058-8585/1/2/025003, Downloaded Sep. 2, 2017, 13 Pages.

Notification Concerning Transmittal of International Preliminary Report on Patentability, App. No. PCT/GB2018/052035, dated Feb. 6, 2020, 1 Page.

International Preliminary Report on Patentability, App. No. PCT/GB2018/052035, dated Feb. 6, 2020, 1 Page.

Written Opinion of the International Searching Authority, App. No. PCT/GB2018/052035, dated Feb. 6, 2020, 5 Pages.

Wikipedia, "ISO/IEC 18000," https://en.wikipedia.org/w/index.php?title=ISO/IEC_18000&oldid=832008791, Mar. 23, 2018, 2 Pages.

Facen, et al, "Power Supply Generation in CMOS Passive UHF RFID Tags," IEEE, 1-4244-0157-7/06, 2006, pp. 33-36.

Ouda, et al, "Self-Biased Differential Rectifier With Enhanced Dynamic Range for Wireless Powering," IEEE, Transactions on Circuits and Systems-II: Express Briefs, vol. 64, No. 5, May 2017, pp. 515-519.

Application, U.S. Appl. No. 16/817,496, filed Mar. 12, 2020, 83 Pages.

Notification Concerning Transmittal of International Preliminary Report on Patentability (Chapter 1), App. No. PCT/EP2021/025196, filed May 28, 2021, 11 Pages.

\* cited by examiner

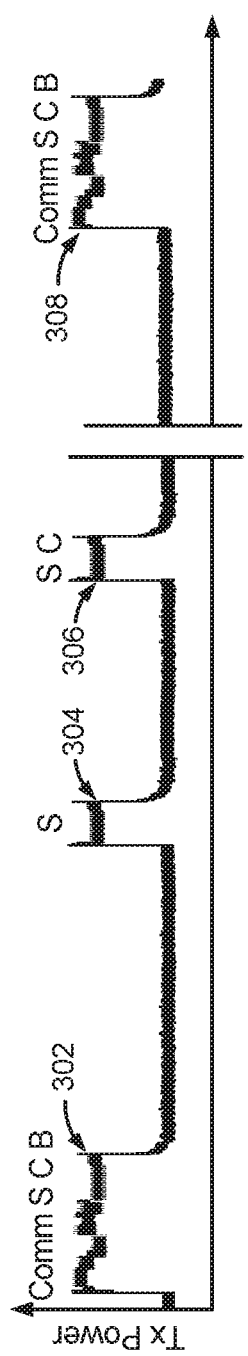
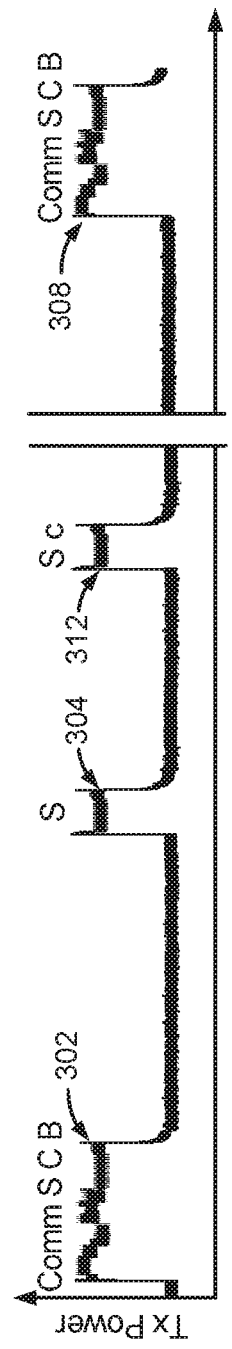
FIG. 3A
FIG. 3B

DEVICE AND/OR METHOD FOR ADAPTIVE COMPUTATION

BACKGROUND

1. Field

Disclosed are devices and techniques for wirelessly powering battery-less devices.

2. Information

Evolution of the so-called Internet-of-Things (IoT) is expected to deploy trillions of devices including battery-less devices such as, for example, radio frequency identification (RFID) tags, battery-less sensors and/or the like. In a particular implementation, processing circuits of such a battery-less device may be powered, at least in part, by radio frequency (RF) energy, light energy or acoustical energy and/or the like transmitted by devices in a close proximity and collected at the battery-less device.

BRIEF DESCRIPTION OF THE DRAWINGS

Claimed subject matter is particularly pointed out and distinctly claimed in the concluding portion of the specification. However, both as to organization and/or method of operation, together with objects, features, and/or advantages thereof, it may be best understood by reference to the following detailed description if read with the accompanying drawings in which:

FIGS. 3A and 3B are timing diagrams illustrating a series of pulses of power signals provided by transmission device according to an embodiment;

Figure 1A:
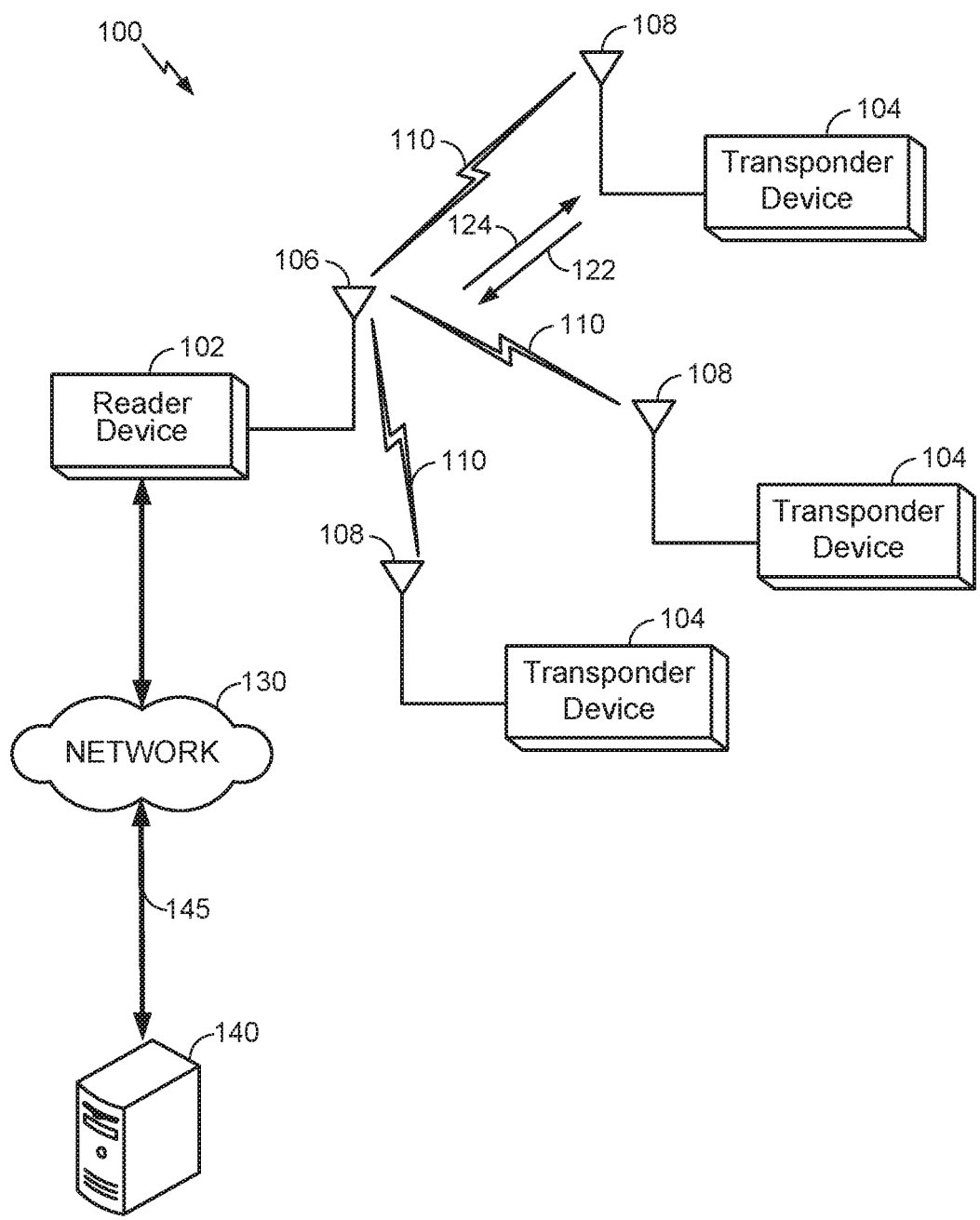
FIG. 1A is a system diagram illustrating certain features of a system containing one or more transponder devices, in accordance with an implementation.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents.

DETAILED DESCRIPTION

References throughout this specification to one implementation, an implementation, one embodiment, an embodiment and/or the like means that a particular feature, structure, and/or characteristic described in connection with a particular implementation and/or embodiment is included in at least one implementation and/or embodiment of claimed subject matter. Thus, appearances of such phrases, for example, in various places throughout this specification are not necessarily intended to refer to the same implementation or to any one particular implementation described. Furthermore, it is to be understood that particular features, structures, and/or characteristics described are capable of being combined in various ways in one or more implementations and, therefore, are within intended claim scope, for example. In general, of course, these and other issues vary with context. Therefore, particular context of description and/or usage provides helpful guidance regarding inferences to be drawn.

According to an embodiment, radio frequency identification (RFID) schemes may enable asymmetric communications between reader devices and very inexpensive, battery-less RFID tags. In an implementation, a battery-less RFID tag may collect and/or harvest and reflect RF energy and/or power emitted from such reader devices. While some battery-less RFID tags may merely provide a signal that indicates an identity of an object associated with and/or co-located with such battery-less RFID tags, more advanced battery-less RFID tags may additionally have processing functionality. For example, some battery-less RFID tags may comprise more complete Computational-RFID (CR-FID) tags having advanced embedded processing capabilities while operating within particular power and/or cost constraints. Additionally, some battery-less RFID tags with advanced processing capabilities may be capable of operating with intermittent collectable incoming power, relying on lower power embedded non-volatile memory technologies such as magnetic random access memory (MRAM) and/or correlated electron random access memory (CeRAM) technologies.

According to an embodiment, a transponder device (e.g., an RFID tag) may collect and/or harvest radio frequency (RF) energy transmitted from an RF signal source (e.g., reader device) for use in powering one or more functions (e.g., sensing, computing and/or signal transmission). In a particular implementation, a reader device may transmit an RF power signal as a pulse waveform having a particular period and duty cycle. An availability of collectable and/or harvestable RF power and/or energy received at a transponder device from such a pulse waveform may depend, at least in part, on a range separating such the transponder device and a reader device, a transmission power of the pulse waveform and/or a duration of a pulse in the pulse waveform.

According to an embodiment, a reader device may operate within power and/or energy consumption constraints and, consequently, may vary transmission of a pulse waveform RF signal providing harvestable and/or collectable power and/or energy to a transponder device. For example, a reader device may reduce a transmission power, pulse duration and/or pulse repetition frequency to reduce consumption of power and/or energy at the reader device. As such, an amount of incident collectable and/or harvestable RF power and/or energy received at a transponder device may be reduced to a level that does not enable fully powering functions (e.g., the aforementioned sensing, computing and/or signal transmission functions) to an extent desired. According to an embodiment, a transponder device may adapt its functions that consume harvestable and/or collectable power and/or energy responsive at least in part to an availability of incident collectable and/or harvestable RF power and/or energy. This may, for example, enable such a transponder device to flexibly tailor and/or optimize its operational effectiveness while power/energy saving measures are in effect at a reader device that is to provide RF power and/or energy to the transponder device.

FIG. 1A is a schematic diagram illustrating certain features of a system 100 containing one or more compute-enabled transponder devices 104, in accordance with an implementation. In the currently illustrated embodiment, a reader device 102 may transmit a radio frequency (RF) signal 110 to one or more transponder devices 104 wherein energy of RF signal 110 harvested and/or collected at an antenna 108 may be used to power one or more capabilities of such a transponder device 104. In some embodiments, a transponder device 104 may reflect and/or backscatter a portion of RF signal 110 back to reader 102 and modulate the reflected and/or backscattered portion of RF signal 110 by detectable symbols and/or parameters (e.g., an identifier of an object associated with and/or co-located with a transponder device 104). Additionally, a transponder device 104 may harvest and/or collect energy received from RF signal 110 for use in powering one or more subsystems of transponder device 104 (e.g., one or more processors, memory, sensors, transceiver devices, display devices, etc., not shown). For example, in addition to having an antenna 108, a transponder device 104 may comprise resonating circuitry and/or structures, charge storage devices (e.g., capacitors) and/or the like to harvest and/or collect energy from a portion of RF signal 110 received at antenna 108. Operating without a chemical battery power source, a transponder device 104 may from time-to-time harvest and/or collect energy of RF signal 110 to, for example, power embedded processing capabilities such as embedded processing capabilities of a CRFID tag. In a particular implementation, reader 102 may transmit RF signal 110 to multiple (e.g., up to 100 or more) transponder devices 104 to, for example, provide power that is harvestable and/or collectable at antenna 108.

In an embodiment, reader device 102 and a transponder device 104 may communicate bidirectionally in that reader device 102 may transmit messages to transponder devices 104 in a downlink signal (e.g., RF signal 110) and transponder devices 104 may transmit messages to reader device 102 in an uplink signal 122. In one example, uplink signal 122 may comprise, for example, a signal indicating and/or expressing an identifier of a corresponding transponder device 104 and/or object co-located with such a corresponding transponder device 104. In an embodiment, uplink signal 122 may comprise a reflection of RF signal 110 that has been modulated with parameters and/or symbols to be detected and/or recovered at reader device 102. In one embodiment, downlink signal 124 may at least in part comprise a modulation of RF signal 110 control signals. In particular implementations, a reader device 102 and a transponder device 104 may exchange messages in a downlink signal 124 and an uplink signal 122 according to one or more signal messaging formats set forth in one or more ISO/IES 18000 conventions.

In other examples in which a transponder device 104 comprises more advanced sensing and/or processing capabilities (e.g., as a CRFID tag), uplink signal 122 may comprise more robust messaging such as, for example, sensor measurements and/or values computed based, at least in part, on sensor measurements.

In an embodiment, reader device 102 may transmit RF signal 110 at an RF signal power level of about one to two watts and comprise a low voltage and/or battery operated device operating within a limited power budget such as, for example, ten watts. In addition to powering a transceiver device (not shown) to transmit RF signal 110 and process received signals transmitted from transponder devices 104, reader device 102 may comprise a single board computer hosting a real-time operating system (e.g., Linux) to enable, for example, Internet access (e.g., via network 130) and to perform device management.

In some implementations, reader device 102 may be installed in a warehouse or retail environment such that reader device 102 may remain powered continuously to service a dense deployment of transponder devices 104. In an alternative implementation in which up to a trillion transponder devices 104 may be more sparsely deployed (e.g., over homes, hospitals, metropolitan areas, etc.), a locally deployed individual reader device 102 may service a smaller local deployment of devices, and may not be continuously powered (e.g., periodically powered up and powered down) to conserve energy. However, if such an individual reader device 102 is powered down or powered off (e.g., no transmission of RF signal 110 of sufficient signal strength to provide harvestable and/or collectable energy at a transponder device 104), no power and/or energy may be collected and/or harvested at transponder devices 104 in range of an RF signal source (e.g., reader device 102). As such, while reader device 102 is powered down or off, transponder devices 104 may not be capable of collecting and/or harvesting sufficient energy to support advanced processing capabilities (e.g., as CRFID tags). In one example implementation, RF signal 110 may be transmitted as a continuous waveform (e.g., sinusoidal waveform) having a pulse envelope. If reader device 102 is powered down or off, such a pulse envelope may be at or about a zero level such that signal power received at a transponder device is negligible.

According to an embodiment, an intensity of collectable and/or harvestable power received at an antenna 108 of a transponder device 104 from transmission of RF signal 110 may be determined based, at least in part, on a power level at which reader device 102 transmits RF signal 110 and other factors including, for example, a range and/or distance between reader device 102 and such a transponder device 104, deviations from line-of-sight transmissions, presence of multi-path, presence of RF shadows from other transponder devices 104, just to provide a few examples of such additional factors. In a particular implementation, reader device 102 may not be aware of such additional factors and also may not be aware an amount of collectable energy and/or power that would be sufficient to power functions (e.g., computing, sensing, processing sensor signals and/or message/signal transmission) of such a transponder device 104. On the other hand, a transponder device 104 may be capable of measuring collectable and/or harvestable power received from RF signal 110 and determining collectable energy and/or power sufficient to power functions of such a transponder device 104.

According to an embodiment, as reader device 102 varies an availability of harvestable and/or collectable power and/or energy to be incident at transponder device 104 (e.g., by varying a duration of pulses RF signal 110), transponder device may vary one or more functions to be powered by such incident power and/or energy. For example, with a reduction in an availability of incident harvestable and/or collectable power and/or energy (e.g., from a shortened pulse of RF signal 110), transponder device may correspondingly adjust functions that are to be powered by the reduced incident power and/or energy.

In the particular implementation of FIG. 1A, for simplicity of illustration system 100 includes multiple transponder devices 104 to receive an RF signal 110 from a single reader device 102. It should be understood that in other implementations as in system 101 of FIG. 1B, a transponder 104 may communicate with and/or receive an RF signal from (e.g., to provide harvestable and/or collectable power) multiple different reader devices 102. Additionally, as shown in system 101, a transponder device 104 may receive an RF signal from one or more power beacon devices 103 that are dedicated to providing a harvestable and/or collectable power from an RF signal (e.g., without uplink and downlink messaging).

Figure 1B:
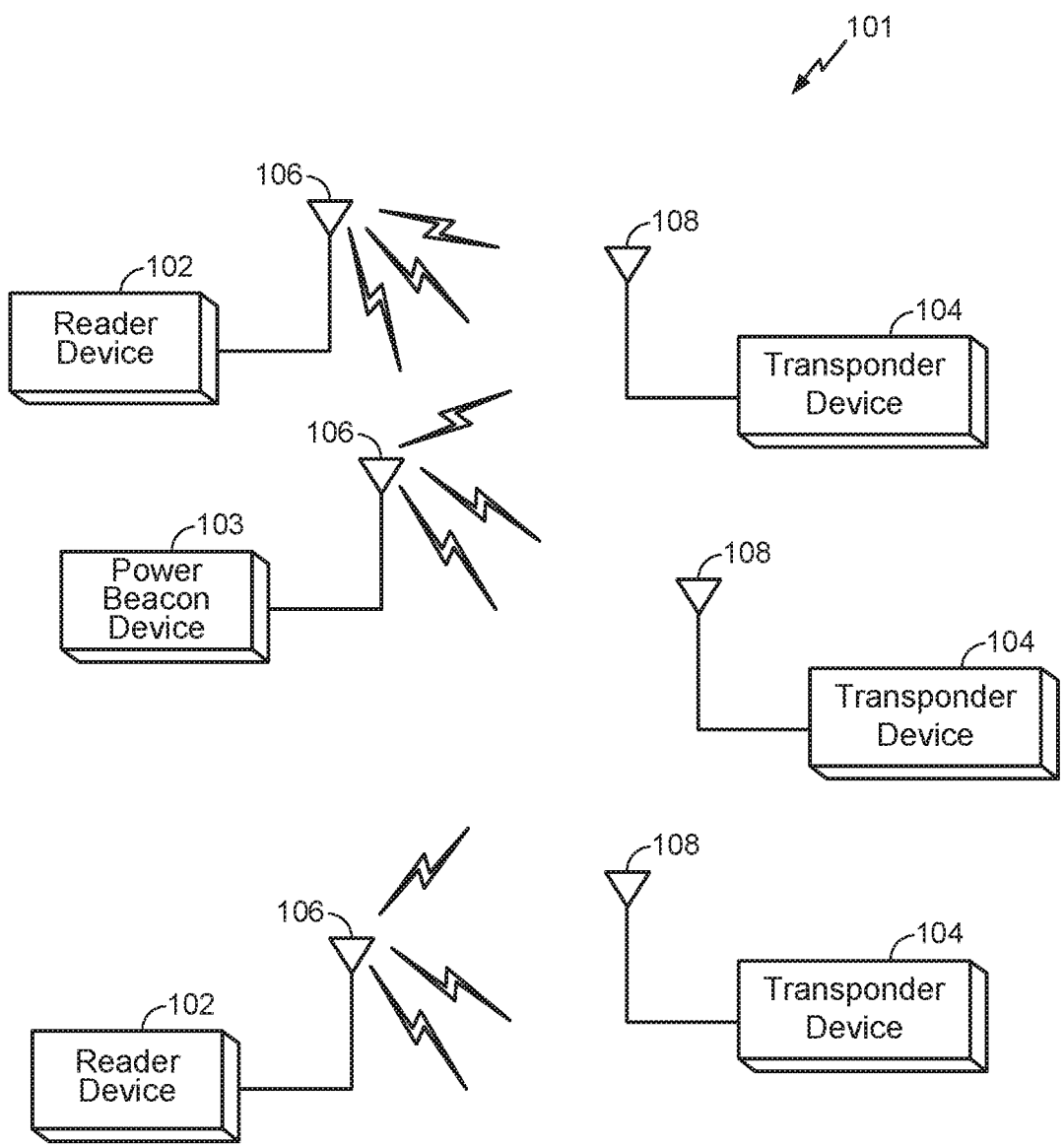
FIG. 1B is a system diagram illustrating certain features of a system containing one or more transponder devices, in accordance with an alternative implementation.

While particular example implementations discussed with reference to FIGS. 1A and 1B are directed to use of an RF signal to provide collectable and/or harvestable power and/or energy to a transponder device, it should be understood that an RF signal is merely an example power signal, that embodiments described herein may applicable to use of different types of signals to deliver incident power, and claimed subject matter is not limited in this respect. For example, a power signal may comprise, for example, collectable and/or harvestable signal power and/or energy in the form of an RF power signal, light power signal (e.g., IR) and/or acoustical power signal, just to provide a few examples.

According to an embodiment, a transmitting device (e.g., reader device 102 or power beacon device 103) may predetermine a schedule for transmission of a power signal (e.g., to be incident at a reader device to provide collectable and/or harvestable power and/or energy). In this context, a "schedule" as referred to herein means a predetermined timing of at least one aspect of transmission of a signal. In one implementation, a schedule may determine timing of pulses in a pulsed envelope of a continuous waveform signal. For example, a schedule for transmission of an RF power signal may at least in part specify a repeating period for transmission of a pulse waveform and a duty cycle.

As pointed out above, a transmitting device (e.g., reader device 102 or power beacon device 103) may comprise a low voltage and/or battery operated device operating within a limited power budget to operate under lower power constraints. As such, such a transmitting device may determine a schedule for transmission of a power signal in accordance with factors such as an average power budget, an expected remaining battery life and/or additional functionality to be enabled by a remaining power/energy resource, just to provide a few examples.

Figure 2A:
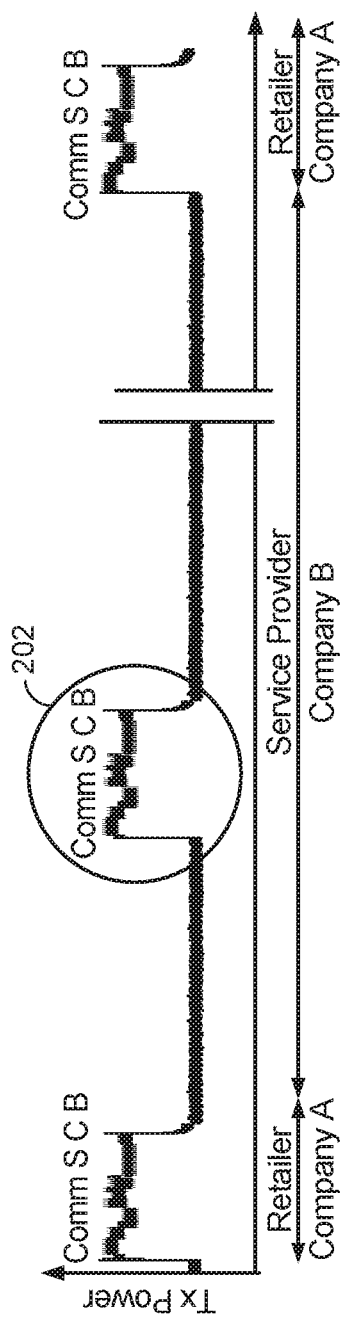
FIG. 2A is a timing diagram illustrating a series of pulses of power signals provided by a reader device according to an embodiment.

FIG. 2A is a timing diagram illustrating a series of pulses of power signals provided by a reader device according to an embodiment. In a particular implementation, a first device (e.g., reader device 102) may transmit a pulse waveform at a particular transmission power, pulse duration, duty cycle, pulse period and/or pulse repetition frequency. According to an embodiment, information collected and/or computations based on collected information may be obtained, controlled and/or "owned" by different parties such as, for example, a retailer of products (e.g., perishable products having shelf life) or a service provider that facilitates collection of information and/or computations based on collected information. As pointed out above, such a transmitted pulse waveform may provide to a second device (e.g., transponder 104) an incident power signal having collectable and/or harvestable energy and/or power that may be consumed at the second device to perform one or more functions. An incident power signal received by such a second device may be collected and/or harvested to provide power and/or energy enabling the second device to perform computing operations. Such an incident power signal may enable such a second device to power one or more subsystems from signal energy collected and/or harvested from the incident power signal. Such subsystems may comprise devices of a transponder device (e.g., transponder device 104) such as, for example, sensors, circuitry for conditioning sensor signals, analog-to-digital circuitry for sampling conditioned sensor signals, processors and non-volatile memory for processing sensor signals and performing related computations, RF circuitry for transmitting and receiving messages, just to provide a few examples of subsystems at a transponder device that may be powered from power and/or energy collected and/or harvested from a received incident power signal.

Figure 2B:
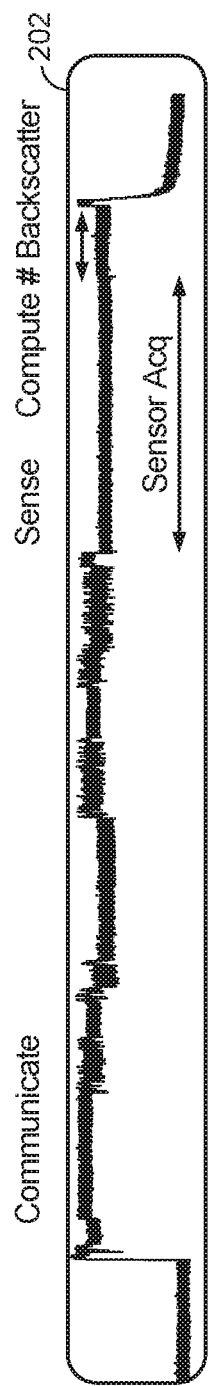
FIG. 2B is a diagram illustrating features of a pulse of a power signal provided by a reader device including a backscatter period according to an embodiment.

According to an embodiment, and as shown in FIG. 2B, different actions may be performed by such a first device transmitting a pulse waveform and a second device receiving the pulse waveform over a duration of a pulse 202 in a pulse waveform shown in FIG. 2A. Over an initial portion of pulse 202, a first device may transmit one or more messages (e.g., as specially formatted signal packets) over a "communicate" portion of pulse 202 to a receiving second device. Such a "communicate" portion of pulse 202 may at least in part implement a downlink signal (e.g., downlink signal 124, FIG. 1A). Over a duration of pulse 202 incident on a second device, the second device may collect and/or harvest power and/or energy to be used in powering one or more functions to be performed at the second device. For instance, as shown in FIG. 2B such collected and/or harvested power and/or energy may power sensing, computing and/or backscattering functions, just to provide a few examples.

As shown in FIG. 2B, during a "sensor acquisition" portion, a second device may collect observations, samples and/or measurements based on one or more signals generated by one or more sensors (e.g., atmospheric pressure sensor, humidity sensor, light sensor and/or temperature sensor) at a second device collecting and/or harvesting power and/or energy from pulse 202. During a "compute" portion of pulse 202, such a second device may perform one or more computations such as, for example, computations to process samples, observations and/or measurements based on sensor signals obtained during a "sensor acquisition" portion. Such computations may comprise, for example, a statistical analysis of observations and/or measurements based on sensor signals (e.g., mean, standard deviation and/or computation quality metrics). As shown in FIG. 2B, sensor acquisition and compute portions may overlap over a portion of pulse 202. Also, FIG. 2B shows a "backscatter" period that follows a compute portion in pulse 202 in which a second receiving pulse 202 may modulate a reflected signal based, at least part, on a message to be transmitted back to a first device transmitting pulse 202. Such a message modulating a reflected signal may comprise a specially formatted signal packet to contain computing results determined and/or obtained during the "compute" period. In an embodiment, such a backscatter period may comprise an implementation of an uplink signal (e.g. uplink signal 122, FIG. 1A).

Figure 2C:
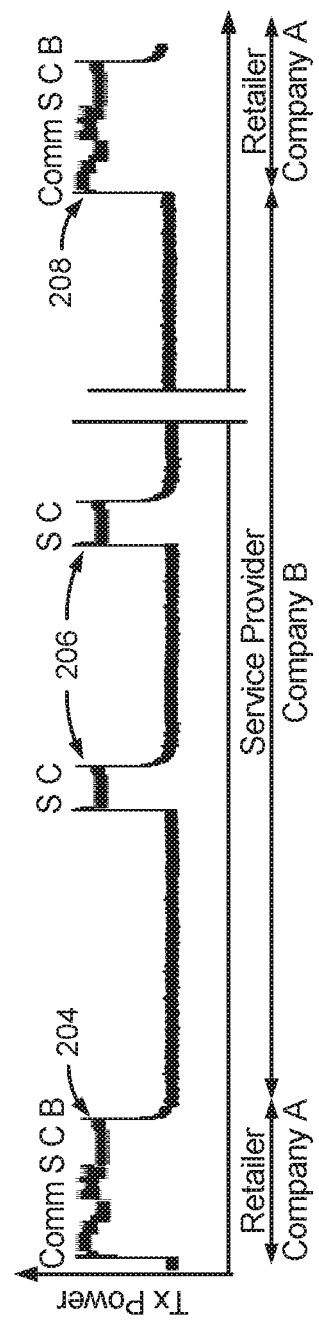
FIG. 2C is a timing diagram illustrating a series of pulses of power signals provided by a reader device including some pulses that do not include associated backscatter periods according to an embodiment.

In the particular implementation of FIG. 2C, pulses 204 and 208 to be incident at a device may include "communicate" and "backscatter" portions to support bi-directional communication (e.g., transmission of a message in "communicate" portion to implement an uplink signal and modulation of a reflection of received pulse energy in a "backscatter" portion to implement a downlink signal). As shown in FIGS. 2A, 2C, 3A, 3B, 4A, 4B and 6 abbreviations "S", "C" and "B" are to mean "sense," "compute" and "backscatter" periods of associated pulses, respectively. To conserve energy, for example, pulses 206 transmitted between pulses 204 and 206 may be of a shorter duration while omitting "communicate" and "backscatter" portions provided in pulses 204 and 208. Pulses 206 incident at a device may, however, provide sufficient collectable and/or harvestable power and/or energy to enable commencement of a "sensor acquisition" period followed by a "compute" portion to perform one or more computations (e.g., to process samples, observations and/or measurements based, at least in part, on one or more signals generated by one or more sensors). In one particular embodiment, results of computations powered by harvesting and/or collecting power and/ or energy from pulses 206 may be locally stored in a non-volatile memory, and transmitted to a reader device in message modulating a backscatter portion of pulse 208 providing an uplink signal.

In one embodiment, pulses 204, 206 and 208 may be transmitted by a reader device (e.g., a reader device 102) where pulses 206 are shortened to conserve energy. In another embodiment, pulses 204 and 208 may be transmitted by a reader device while pulses 206 may be transmitted by a device dedicated to transmitting a power signal having harvestable and/or collectable power and/or energy (e.g., power beacon device 103).

As pointed out above, a device transmitting a pulse waveform to provide an incident power signal having harvestable and/or collectable power and/or energy (e.g., reader device 102 or power beacon device 103) may, from time to time, operate under reduced power and/or energy constraints. As pointed out above, to reduce power and/or a rate of consumption of energy, such a device may reduce an intensity and/or duration of a pulse in such a pulse waveform. As shown in FIG. 3A, pulses 302 and 308 may be transmitted at a sufficient duration and/or intensity to provide sufficient harvestable and/or collectable power and/or energy incident at a receiving device to enable associated functions during "communicate", "sense", "compute" and "backscatter" portions. Pulse 306 may have an intensity and/or duration to provide sufficient harvestable and/or collectable power and/or energy incident at a receiving device to enable the receiving device to perform "sense" and "compute" functions. To consume less energy and/or power at a transmitting device, pulse 304 may be shorter and/or have a lower intensity than pulse 306. Pulse 304 may provide sufficient harvestable and/or collectable energy and/ or power incident at a receiving to enable the receiving device to perform a "sense" function. However, pulse 304 may not deliver sufficient harvestable and/or collectable energy and/or power incident at a receiving to enable the receiving device to perform a "compute" function (e.g., in addition to a "sense" function). In an example implementation, samples, observations and/or measurements collected in a "sense" function powered by harvestable and/or collectable energy and/or power in pulse 304 may be stored (e.g., in a non-volatile memory device). Such stored samples, observations and/or measurements may then be processed (e.g., along with samples, observations and/or measurements collected in a "sense" function powered by harvestable and/or collectable energy and/or power in pulse 306) during a "compute" function powered by incident harvestable and/or collectable energy and/or power in pulse 306. At least partial results of processing at a "compute" function powered by harvestable and/or collectable energy and/or power in pulse 306 may then be stored in a non-volatile memory device, and then transmitted in a message modulating a signal during a "backscatter" function powered by harvestable and/or collectable energy and/or power in pulse 308, for example. In addition to at least partial results of processing at a "compute" function powered by harvestable and/or collectable energy and/or power in pulse 306, a state of a processor (e.g., a processor used to obtain such results of processing) may be stored in a non-volatile memory device.

In the particular scenario of FIG. 3B, pulse 306 may be replaced by pulse 312 having a reduced a duration. Here, incident harvestable and/or collectable energy and/or power provided by pulse 312 may be sufficient to enable a transponder device to perform a "sense" function as powered by pulse 306. However, pulse 312 may not provide sufficient incident power and/or energy to enable completion of a "compute" function that may be powered by pulse 306. Thus, instead of performing such a complete "compute" function, a device receiving pulse 312 may perform a less power and/or energy intensive "compute" function (denoted by a lower case "c") to, for example, process samples, observations and/or measurements obtained during "sense" functions powered by energy and/or power from pulses 304 and 312.

In one particular example, such a less power and/or energy intensive "compute" function (e.g., powered by pulse 312) may employ less power and/or energy intensive arithmetic operations at a processor. Use of such less power and/or energy intensive arithmetic operations may comprise executing few iterations of a processing loop, using shorter cyclic redundancy codes (e.g., CRC5 in lieu of CRC32), changing processor vector-length, using fixed-point operations in lieu of floating-point operations and/or using multi-cycle multiplication operations instead of single-cycle accelerated multiplication operations, just to provide a few examples. In another particular example, such a less power and/or energy intensive "compute" function may employ less power and/or energy algorithm to be executed at a processor. Here, a "compute" function performed by a receiving device from power and/or energy collected from pulse 306 may comprise computation of a mean and standard deviation of sample and/or measurement values. To reduce power and/or energy consumption, such a receiving device may perform an algorithm powered by power and/or energy from pulse 312 to entail fewer computations to, for example, merely obtain a median value or a mean and/or standard deviation based on a reduced number of sample and/or measurement values (e.g., based on every other or every third sample and/or measurement value).

As discussed above, a reader device (e.g., reader device 102, FIG. 1A) may forward one or more downlink messages to a transponder device (e.g., transponder device 104, FIG. 1A) during a "communicate" portion of a pulse provided in a signal to be incident at the transponder device (and to provide collectable and/or harvestable power and/or energy). In an embodiment, such downlink messages from a reader device may comprise commands to a transponder device where the reader device acts as a "master" device and the transponder device acts as a "slave" device. Such commands transmitted in a pulse may specify, for example how a transponder device is to perform subsequent "sense" and/or "compute" functions in the pulse (and possibly how the transponder device is to perform "sense" and/or "compute" functions in one or more subsequent pulses).

Figure 4A:
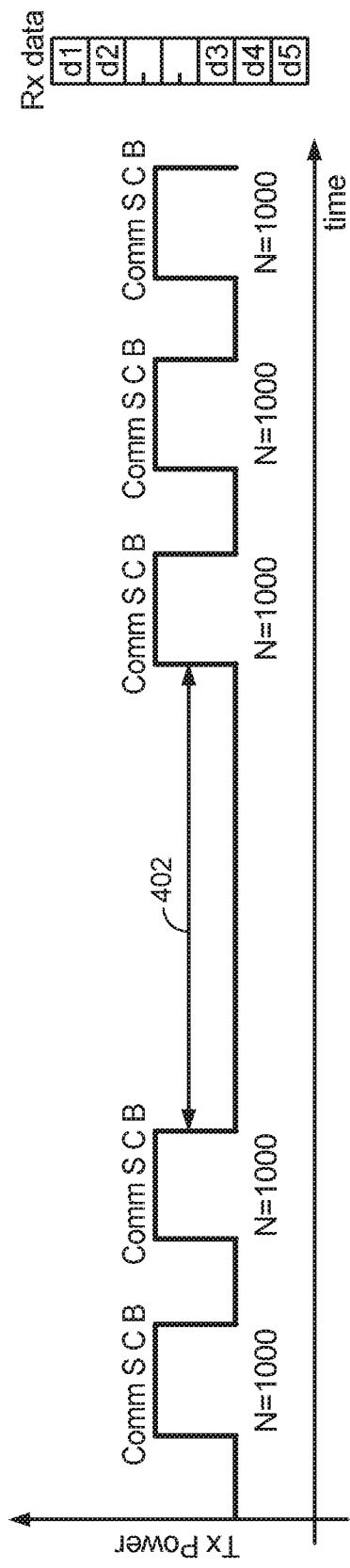
FIGS. 4A and 4B are timing diagrams illustrating a series of pulses of power signals provided by a transmission device according to an embodiment.

According to an embodiment, a command from a reader device in a message provided during a "communicate" portion of a pulse transmitted by the reader device may specify that a transponder device obtain a set number of samples, observations and/or measurements based on one or more signals from one or more sensors during the pulse (e.g., to maintain a particular quality of a computed result based on the obtained samples, observations and/or measurements). As illustrated in FIG. 4A, for example, a reader device may include a command in a message transmitted during a "communicate" function of a pulse specifying an N=1000 number of samples, observations and/or measurements to be obtained in a "sense" function and processed in a "compute" function powered by the pulse. A computing result may then be returned in a message modulating a signal transmitted in a "backscatter" function powered by the pulse.

While pulses in a waveform may be transmitted by a reader device in a set pulse period, pulse width, duty cycle and/or pulse repetition frequency, under certain conditions as discussed above, such a reader device may reduce power and/or energy to transmit a pulse having sufficient duration to enable collection of a specified number of samples, observations and/or measurements at every pulse period. For example, while FIG. 4A shows pulses having a uniform duration to individually provide sufficient collectable energy and/or power to obtain and process an N=1000 number of samples, observations and/or measurements, and communicate results in a message modulating a backscatter signal. As shown in FIG. 4A, a pulse period may be skipped in a duration 402 to, for example, reduce consumption of energy and/or power (e.g., within an available energy and/or power budget) at a reader device.

Figure 4B:
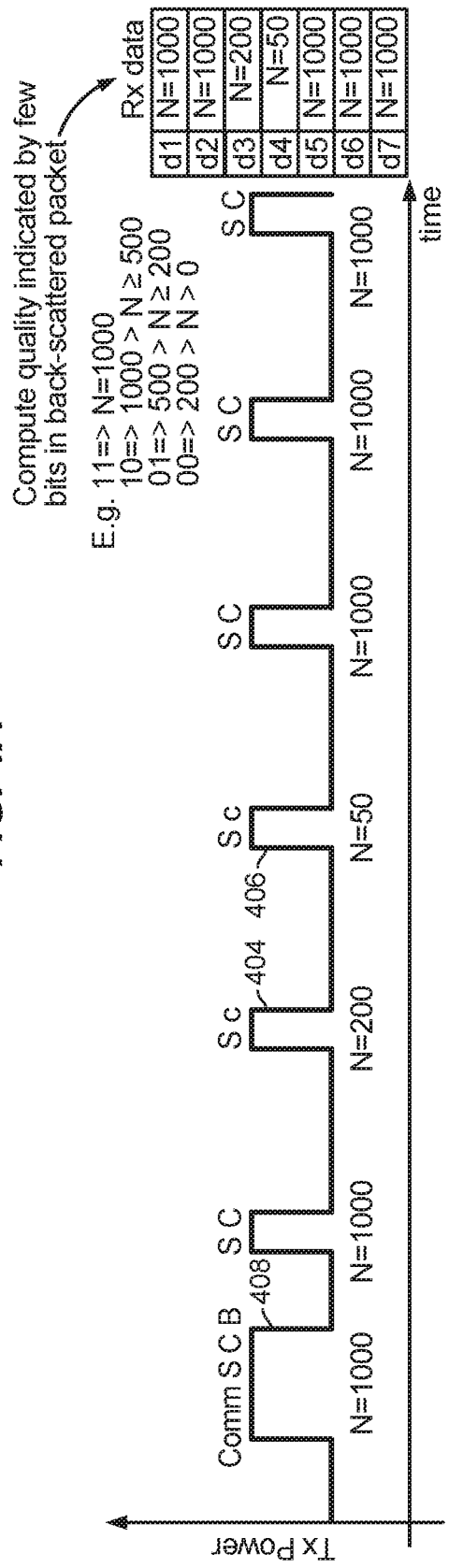

According to an embodiment as shown in FIG. 4B, following an initial pulse 408, a duration of subsequent pulses may be shortened to provide sufficient power and/or energy to enable a transponder device to perform "sense" and "compute" functions, but not sufficient power and/or energy to perform a "backscatter" function. Additionally, a downlink message in a "communicate" portion of pulse 408 may specify an N number of samples, observations and/or measurements to be obtained in a "sense" portion of pulse 408 (e.g., N=1000 as shown) and to be obtained in a "sense" portion of pulses subsequent to pulse 408 (e.g., N=1000, 200 or 50 as shown). In an alternative implementation, a receiving device may itself determine an N number of samples, observations and/or measurements to be obtained in a "sense" portion of power signal pulse and/or a level of computation to be performed during a "compute" portion of a power signal pulse based, at least in part, on an expected availability of collectable and/or harvestable power and/or energy to be incident (e.g., based on an expected intensity and/or pulse duration). For example, a downlink message in a "communicate" portion of pulse 408 may specify a duration and/or power level of subsequent pulses and a receiving device may then tailor N and/or a level of computation to be performed based, at least in part, the specified duration and/or power level of the subsequent pulses. Alternatively, a transponder device may determine an expected intensity and/or pulse duration independently of a downlink message (e.g., based on measurements and/or heuristics), and tailor N and/or a level of computation to be performed accordingly within available harvested and/or collected power and/or energy. In another implementation, a downlink message in a "communicate" portion of pulse 408 from a reader device may specify to a transponder device an average number of samples to be obtained over a duration of multiple pulses. The transponder device may then determine an N number of samples, observations and/or measurements for each pulse over the duration to achieve the average number of subject to an expected availability of collectable and/or harvestable power and/or energy to be incident during the pulse.

According to an embodiment, a duration in a pulse of a pulse waveform may be further reduced so as to enable obtaining a reduced number of samples, observations and/or measurements during a "sense" function. For example, in lieu of skipping transmission of a pulse (such as skipping a pulse in interval 402 as shown in FIG. 4A), durations of pulses 404 and 406 may be further reduced to further reduce consumption of energy and/or power at a reader device. Here, a duration of pulse 404 may provide harvestable and/or collectable energy and/or power to enable obtaining a total of N=200 samples, observations and/or measurements, during a "sense" function powered by pulse 404. Likewise, a duration of pulse 406 may provide harvestable and/or collectable energy and/or power to enable obtaining a total of N=50 samples, observations and/or measurements, during a "sense" function powered by pulse 406. As pointed out above, such a total of N samples to be obtained as powered by pulses 404 and/or 406 may be specified as a command in a downlink message to a reader device or determined at a reader device based on an expected availability of collectable and/or harvestable power and/or energy to be incident from pulses 404 and/or 406.

Figure 5:
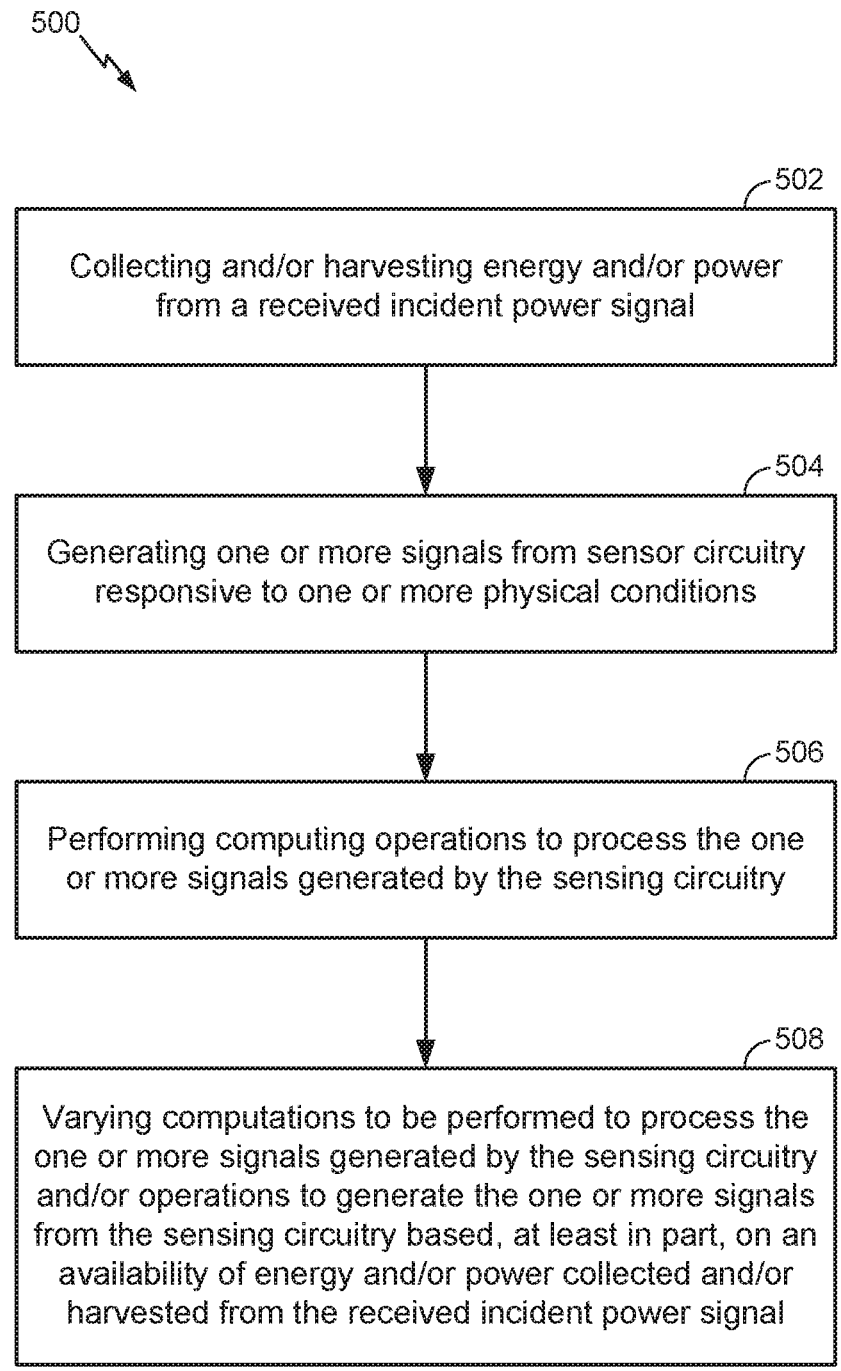
FIG. 5 is a flow diagram of a process for powering device to perform one or more computations according to an embodiment.

FIG. 5 is a flow diagram of a process for powering a device to perform one or more computations according to an embodiment. In a particular implementation, process 500 may be performed, in whole or in part, by a transponder device (e.g., transponder device 104). Block 502 may comprise collecting and/or harvesting energy from an incident power signal as illustrated in FIGS. 2A, 2B, 2C, 3A, 3B, 4A and/or 4B, for example. As pointed out above, one or more sensors of a transponder device may generate one or more signals responsive to some physical and/or environmental phenomena (e.g., temperature, ambient light, atmospheric pressure, etc.). At block 504, for example, during receipt of a "sense" portion of an incident pulse of a power signal as described above with reference to FIGS. 2A, 2B, 2C, 3A, 3B, 4A and/or 4B, a transponder device may obtain one or more samples, observations and/or measurements. Such samples, observations, samples and/or measurements may be obtained, for example, from one or more sensors powered by energy and/or power collected and/or harvested at block 502 (e.g., during a "sense" portion of a received power signal pulse and contemporaneous with collection of such observations, samples and/or measurements). At block 506, a transponder device may perform one or more computations based, at least in part, on one or more signals generated at block 504. For example, a transponder may execute one or more computations powered by power and/or energy harvested and/or collected at block 502 during a "compute" portion of an incident power signal pulse (e.g., to process samples, observations and/or measurements may be obtained at block 504 during a "sense" portion of the incident pulse.

As pointed out above, a duration of pulses in a signal provided to power one or more subsystems of a transponder device may be varied, for example, to reduce power and/or energy consumed at a transmitter of the signal (e.g., reader device 102). Also as discussed above, such a transponder device may adapt and/or tailor functions to an availability of harvestable and/or collectable energy and/or power from an incident power signal pulse. At block 508, for example, a transponder device may vary computations to be performed at block 506 based, at least in part, on an availability of energy and/or power to be harvestable and/or collectable at block 502. For example, as illustrated at pulse 312 (FIG. 3B), a transponder device may employ a less power and/or energy intensive computation (e.g., at block 506) during a "compute" portion of an incident power signal pulse by using less power and/or energy intensive arithmetic operations at a processor and/or using less power and/or energy algorithm to be executed at a processor. Alternatively or in addition, a transponder device at block 508 may collect a reduced number of samples, observations and/or measurements at block 504 (e.g., during a "sense" portion of an incident power signal pulse) based, at least in part, on an availability of energy and/or power to be harvestable and/or collectable at block 502.

As pointed out above according to a particular embodiment, a reader device may specify an average number of samples, observations and/or measurements in a "communicate" portion of pulse 408 (FIG. 4B) an average number of samples, observations and/or measurements to be obtained in one or more subsequent pulses. In another implementation, a reader may determine that a transponder device is to obtain a particular minimum number of samples, observations and/or measurements from power and/or energy that is to be harvested and/or collected over a single pulse. For example, such a minimum number of samples, observations and/or measurements may be determined to enable one or more computations (e.g., during a "compute" portion of an incident signal pulse) of sufficient threshold quality to justify consumption of power and/or energy at a reader device to transmit the single pulse.

Figure 6:
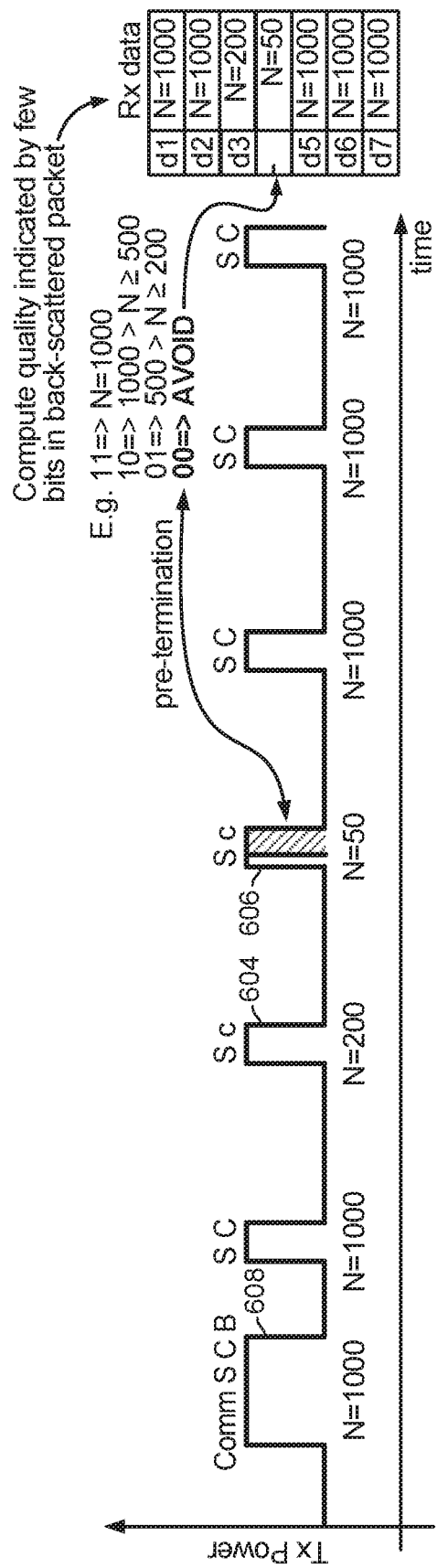
FIG. 6 is a timing diagram illustrating a series of pulses of a power signal to provide collectable and/or harvestable power and/or energy according to an embodiment.

FIG. 6 is a timing diagram illustrating a series of pulses of a power signal to provide collectable and/or harvestable power and/or energy according to an embodiment. An initial pulse 608 transmitted by a reader device a "communicate" portion may include a downlink message to a transponder device specifying a minimum number of samples, observations and/or measurements from power and/or energy that are to be harvested and/or collected over any single pulse in one or more subsequent pulses.

According to an embodiment, to reduce consumption of energy and/or power, a reader device may terminate transmission of pulse 606 if it is determined that a recipient transponder device is not capable of obtaining a minimum number samples, observations and/or measurements from energy and/or power that would be collected and/or harvested over pulse 606 if not terminated early. In the particular example illustrated in FIG. 6, a specified minimum number of samples, observations and/or measurements to be collected over a pulse may be set at $N_{min}=200$.

Figure 7:
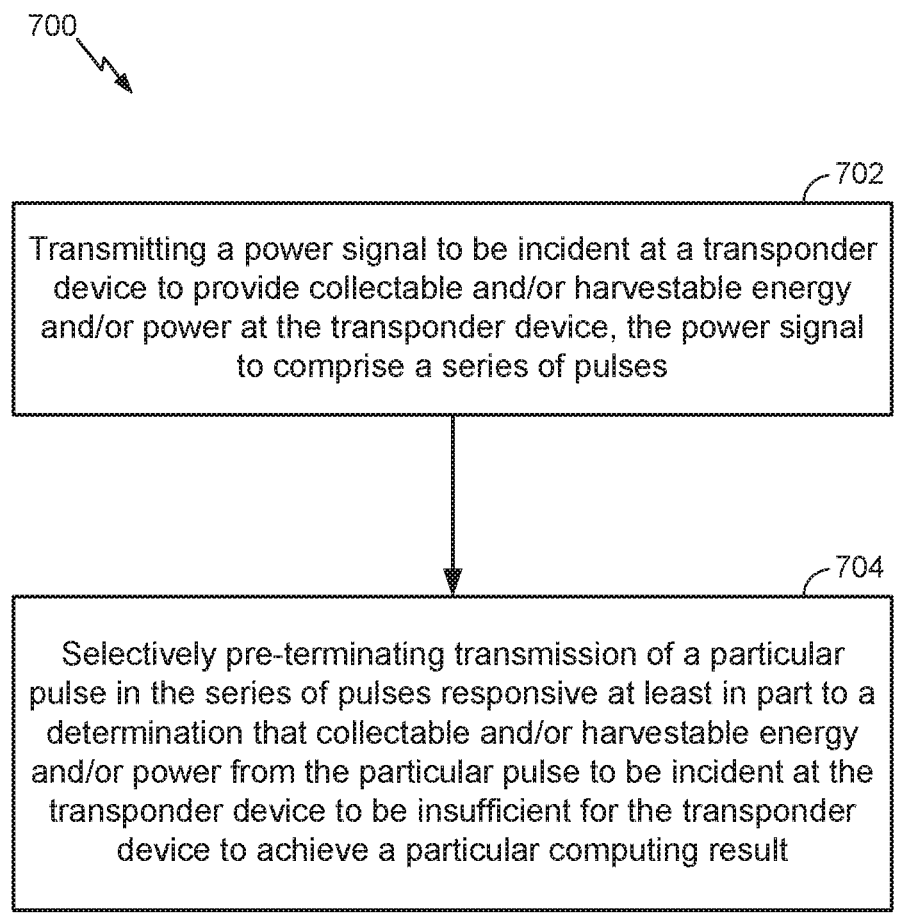
FIG. 7 is a flow diagram of a process for transmitting a power signal to a receiving device according to an embodiment.

FIG. 7 is a flow diagram of an example process 700 for transmitting a power signal to a transponder device according to an embodiment. At block 702, a reader device may transmit a power signal to be incident at a transponder device. Such a power signal may have a profile including a series of pulses as shown in FIG. 6, for example. At block 704, a reader device may pre-terminate transmission of a particular pulse in a series of pulses if it is determined that a transponder device receiving the particular pulse would be incapable of achieving a particular computing result based, at least in part, on samples, observations and/or measurements that would be obtainable of the particular pulse were to complete. Here, in the particular example, of FIG. 6, a reader device may pre-terminate transmission of pulse 606 at block 704 if it is determined that completing transmission of pulse 606 (e.g., as originally scheduled) would not provide sufficient collectable and/or harvestable power and/or energy incident at a transponder device for the transponder device to obtain computations of sufficient quality. For example, it may be determined at block 704 that collectable and/or harvestable power and/or energy incident at a transponder device from complete transmission number of pulse 606 may not be sufficient for the transponder device to obtain a sufficient samples, observations and/or measurements during a "sense" portion of pulse 606 to achieve a computing result of a minimum desired quality. Alternatively, it may be determined at block 704 that collectable and/or harvestable power and/or energy incident at a transponder device from complete transmission number of pulse 606 may not be sufficient for the transponder device to perform sufficient computing in a "compute" portion of pulse 606 achieve a computing result of a minimum desired quality.

According to an embodiment, a reader device may implement any one of several techniques at block 704 to determine that collectable and/or harvestable power and/or energy incident at a transponder device from complete transmission of pulse 606 may be insufficient to enable a computing result of a minimum desired quality. For example, a reader device may have previously determined an energy/power harvesting capability of a transponder device, a range to such a transponder device and/or an ability of such a transponder device to complete computations (e.g., based on prior transmissions). Here, techniques at block 704 may determine that complete transmission of pulse 606 would be insufficient to enable a computing result of a minimum desired quality based, at least in part on these previously determined factors. In another particular scenario, a transponder device may be affected by factors other than an availability of collectable and/or harvestable power and/or energy or ability to harvest same. For example, a transponder changing a processing vector length of a processor may reduce a quality of computations. Here, a transponder device may be capable of transmitting a current quality indicator (e.g., in an uplink message). Based, at least in part, on such a current quality indicator and/or a history/trend of such quality indicators, a reader device may terminate pulse 606.

It should be noted that the various circuits disclosed herein may be described using computer aided design tools and expressed (or represented), as data and/or instructions embodied in various machine-readable media, in terms of their behavioral, register transfer, logic component, transistor, layout geometries, and/or other characteristics. Formats of files and other objects in which such circuit expressions may be implemented include, but are not limited to, formats supporting behavioral languages such as C, Verilog, and HLDL, formats supporting register level description languages like RTL, and formats supporting geometry description languages such as GDSII, GDSIII, GDSIV, CIF, MEBES and any other suitable formats and languages. Storage media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.).

If received within a computer system via one or more machine-readable media, such data and/or instruction-based expressions of the above described circuits may be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image may thereafter be used in device fabrication, for example, by enabling generation of one or more masks that are used to form various components of the circuits in a device fabrication process.

In the context of the present patent application, the term "connection," the term "component" and/or similar terms are intended to be physical, but are not necessarily always tangible. Whether or not these terms refer to tangible subject matter, thus, may vary in a particular context of usage. As an example, a tangible connection and/or tangible connection path may be made, such as by a tangible, electrical connection, such as an electrically conductive path comprising metal or other conductor, that is able to conduct electrical current between two tangible components. Likewise, a tangible connection path may be at least partially affected and/or controlled, such that, as is typical, a tangible connection path may be open or closed, at times resulting from influence of one or more externally derived signals, such as external currents and/or voltages, such as for an electrical switch. Non-limiting illustrations of an electrical switch include a transistor, a diode, etc. However, a "connection" and/or "component," in a particular context of usage, likewise, although physical, can also be non-tangible, such as a connection between a client and a server over a network, particularly a wireless network, which generally refers to the ability for the client and server to transmit, receive, and/or exchange communications, as discussed in more detail later.

In a particular context of usage, such as a particular context in which tangible components are being discussed, therefore, the terms "coupled" and "connected" are used in a manner so that the terms are not synonymous. Similar terms may also be used in a manner in which a similar intention is exhibited. Thus, "connected" is used to indicate that two or more tangible components and/or the like, for example, are tangibly in direct physical contact. Thus, using the previous example, two tangible components that are electrically connected are physically connected via a tangible electrical connection, as previously discussed. However, "coupled," is used to mean that potentially two or more tangible components are tangibly in direct physical contact. Nonetheless, "coupled" is also used to mean that two or more tangible components and/or the like are not necessarily tangibly in direct physical contact, but are able to co-operate, liaise, and/or interact, such as, for example, by being "optically coupled." Likewise, the term "coupled" is also understood to mean indirectly connected. It is further noted, in the context of the present patent application, since memory, such as a memory component and/or memory states, is intended to be non-transitory, the term physical, at least if used in relation to memory necessarily implies that such memory components and/or memory states, continuing with the example, are tangible.

Unless otherwise indicated, in the context of the present patent application, the term "or" if used to associate a list, such as A, B, or C, is intended to mean A, B, and C, here used in the inclusive sense, as well as A, B, or C, here used in the exclusive sense. With this understanding, "and" is used in the inclusive sense and intended to mean A, B, and C; whereas "and/or" can be used in an abundance of caution to make clear that all of the foregoing meanings are intended, although such usage is not required. In addition, the term "one or more" and/or similar terms is used to describe any feature, structure, characteristic, and/or the like in the singular, "and/or" is also used to describe a plurality and/or some other combination of features, structures, characteristics, and/or the like. Likewise, the term "based on" and/or similar terms are understood as not necessarily intending to convey an exhaustive list of factors, but to allow for existence of additional factors not necessarily expressly described.

Furthermore, it is intended, for a situation that relates to implementation of claimed subject matter and is subject to testing, measurement, and/or specification regarding degree, that the particular situation be understood in the following manner. As an example, in a given situation, assume a value of a physical property is to be measured. If alternatively reasonable approaches to testing, measurement, and/or specification regarding degree, at least with respect to the property, continuing with the example, is reasonably likely to occur to one of ordinary skill, at least for implementation purposes, claimed subject matter is intended to cover those alternatively reasonable approaches unless otherwise expressly indicated. As an example, if a plot of measurements over a region is produced and implementation of claimed subject matter refers to employing a measurement of slope over the region, but a variety of reasonable and alternative techniques to estimate the slope over that region exist, claimed subject matter is intended to cover those reasonable alternative techniques unless otherwise expressly indicated.

To the extent claimed subject matter is related to one or more particular measurements, such as with regard to physical manifestations capable of being measured physically, such as, without limit, temperature, pressure, voltage, current, electromagnetic radiation, etc., it is believed that claimed subject matter does not fall within the abstract idea judicial exception to statutory subject matter. Rather, it is asserted, that physical measurements are not mental steps and, likewise, are not abstract ideas.

It is noted, nonetheless, that a typical measurement model employed is that one or more measurements may respectively comprise a sum of at least two components. Thus, for a given measurement, for example, one component may comprise a deterministic component, which in an ideal sense, may comprise a physical value (e.g., sought via one or more measurements), often in the form of one or more signals, signal samples and/or states, and one component may comprise a random component, which may have a variety of sources that may be challenging to quantify. At times, for example, lack of measurement precision may affect a given measurement. Thus, for claimed subject matter, a statistical or stochastic model may be used in addition to a deterministic model as an approach to identification and/or prediction regarding one or more measurement values that may relate to claimed subject matter.

For example, a relatively large number of measurements may be collected to better estimate a deterministic component. Likewise, if measurements vary, which may typically occur, it may be that some portion of a variance may be explained as a deterministic component, while some portion of a variance may be explained as a random component. Typically, it is desirable to have stochastic variance associated with measurements be relatively small, if feasible. That is, typically, it may be preferable to be able to account for a reasonable portion of measurement variation in a deterministic manner, rather than a stochastic matter as an aid to identification and/or predictability.

Along these lines, a variety of techniques have come into use so that one or more measurements may be processed to better estimate an underlying deterministic component, as well as to estimate potentially random components. These techniques, of course, may vary with details surrounding a given situation. Typically, however, more complex problems may involve use of more complex techniques. In this regard, as alluded to above, one or more measurements of physical manifestations may be modelled deterministically and/or stochastically. Employing a model permits collected measurements to potentially be identified and/or processed, and/or potentially permits estimation and/or prediction of an underlying deterministic component, for example, with respect to later measurements to be taken. A given estimate may not be a perfect estimate; however, in general, it is expected that on average one or more estimates may better reflect an underlying deterministic component, for example, if random components that may be included in one or more obtained measurements, are considered. Practically speaking, of course, it is desirable to be able to generate, such as through estimation approaches, a physically meaningful model of processes affecting measurements to be taken.

In some situations, however, as indicated, potential influences may be complex. Therefore, seeking to understand appropriate factors to consider may be particularly challenging. In such situations, it is, therefore, not unusual to employ heuristics with respect to generating one or more estimates. Heuristics refers to use of experience related approaches that may reflect realized processes and/or realized results, such as with respect to use of historical measurements, for example. Heuristics, for example, may be employed in situations where more analytical approaches may be overly complex and/or nearly intractable. Thus, regarding claimed subject matter, an innovative feature may include, in an example embodiment, heuristics that may be employed, for example, to estimate and/or predict one or more measurements.

It is further noted that the terms "type" and/or "like," if used, such as with a feature, structure, characteristic, and/or the like, using "optical" or "electrical" as simple examples, means at least partially of and/or relating to the feature, structure, characteristic, and/or the like in such a way that presence of minor variations, even variations that might otherwise not be considered fully consistent with the feature, structure, characteristic, and/or the like, do not in general prevent the feature, structure, characteristic, and/or the like from being of a "type" and/or being "like," (such as being an "optical-type" or being "optical-like," for example) if the minor variations are sufficiently minor so that the feature, structure, characteristic, and/or the like would still be considered to be substantially present with such variations also present. Thus, continuing with this example, the terms optical-type and/or optical-like properties are necessarily intended to include optical properties. Likewise, the terms electrical-type and/or electrical-like properties, as another example, are necessarily intended to include electrical properties. It should be noted that the specification of the present patent application merely provides one or more illustrative examples and claimed subject matter is intended to not be limited to one or more illustrative examples; however, again, as has always been the case with respect to the specification of a patent application, particular context of description and/or usage provides helpful guidance regarding reasonable inferences to be drawn.

With advances in technology, it has become more typical to employ distributed computing and/or communication approaches in which portions of a process, such as signal processing of signal samples, for example, may be allocated among various devices, including one or more client devices and/or one or more server devices, via a computing and/or communications network, for example. A network may comprise two or more devices, such as network devices and/or computing devices, and/or may couple devices, such as network devices and/or computing devices, so that signal communications, such as in the form of signal packets and/or signal frames (e.g., comprising one or more signal samples), for example, may be exchanged, such as between a server device and/or a client device, as well as other types of devices, including between wired and/or wireless devices coupled via a wired and/or wireless network, for example.

In the context of the present patent application, the term network device refers to any device capable of communicating via and/or as part of a network and may comprise a computing device. While network devices may be capable of communicating signals (e.g., signal packets and/or frames), such as via a wired and/or wireless network, they may also be capable of performing operations associated with a computing device, such as arithmetic and/or logic operations, processing and/or storing operations (e.g., storing signal samples), such as in memory as tangible, physical memory states, and/or may, for example, operate as a server device and/or a client device in various embodiments. Network devices capable of operating as a server device, a client device and/or otherwise, may include, as examples, dedicated rack-mounted servers, desktop computers, laptop computers, set top boxes, tablets, RFID reader devices, netbooks, smart phones, wearable devices, integrated devices combining two or more features of the foregoing devices, and/or the like, or any combination thereof. As mentioned, signal packets and/or frames, for example, may be exchanged, such as between a server device and/or a client device, as well as other types of devices, including between wired and/or wireless devices coupled via a wired and/or wireless network, for example, or any combination thereof. It is noted that the terms, server, server device, server computing device, server computing platform and/or similar terms are used interchangeably. Similarly, the terms client, client device, client computing device, client computing platform and/or similar terms are also used interchangeably. While in some instances, for ease of description, these terms may be used in the singular, such as by referring to a "client device" or a "server device," the description is intended to encompass one or more client devices and/or one or more server devices, as appropriate. Along similar lines, references to a "database" are understood to mean, one or more databases and/or portions thereof, as appropriate.

The term electronic file and/or the term electronic document are used throughout this document to refer to a set of stored memory states and/or a set of physical signals associated in a manner so as to thereby at least logically form a file (e.g., electronic) and/or an electronic document. That is, it is not meant to implicitly reference a particular syntax, format and/or approach used, for example, with respect to a set of associated memory states and/or a set of associated physical signals. If a particular type of file storage format and/or syntax, for example, is intended, it is referenced expressly. It is further noted an association of memory states, for example, may be in a logical sense and not necessarily in a tangible, physical sense. Thus, although signal and/or state components of a file and/or an electronic document, for example, are to be associated logically, storage thereof, for example, may reside in one or more different places in a tangible, physical memory, in an embodiment.

In the context of the present patent application, the terms "entry," "electronic entry," "document," "electronic document," "content,", "digital content," "item," and/or similar terms are meant to refer to signals and/or states in a physical format, such as a digital signal and/or digital state format, e.g., that may be perceived by a user if displayed, played, tactilely generated, etc. and/or otherwise executed by a device, such as a digital device, including, for example, a computing device, but otherwise might not necessarily be readily perceivable by humans (e.g., if in a digital format). Likewise, in the context of the present patent application, digital content provided to a user in a form so that the user is able to readily perceive the underlying content itself (e.g., content presented in a form consumable by a human, such as hearing audio, feeling tactile sensations and/or seeing images, as examples) is referred to, with respect to the user, as "consuming" digital content, "consumption" of digital content, "consumable" digital content and/or similar terms. For one or more embodiments, an electronic document and/or an electronic file may comprise a Web page of code (e.g., computer instructions) in a markup language executed or to be executed by a computing and/or networking device, for example. In another embodiment, an electronic document and/or electronic file may comprise a portion and/or a region of a Web page. However, claimed subject matter is not intended to be limited in these respects.

Also, for one or more embodiments, an electronic document and/or electronic file may comprise a number of components. As previously indicated, in the context of the present patent application, a component is physical, but is not necessarily tangible. As an example, components with reference to an electronic document and/or electronic file, in one or more embodiments, may comprise text, for example, in the form of physical signals and/or physical states (e.g., capable of being physically displayed). Typically, memory states, for example, comprise tangible components, whereas physical signals are not necessarily tangible, although signals may become (e.g., be made) tangible, such as if appearing on a tangible display, for example, as is not uncommon. Also, for one or more embodiments, components with reference to an electronic document and/or electronic file may comprise a graphical object, such as, for example, an image, such as a digital image, and/or sub-objects, including attributes thereof, which, again, comprise physical signals and/or physical states (e.g., capable of being tangibly displayed). In an embodiment, digital content may comprise, for example, text, images, audio, video, and/or other types of electronic documents and/or electronic files, including portions thereof, for example.

Also, in the context of the present patent application, the term parameters (e.g., one or more parameters) refer to material descriptive of a collection of signal samples, such as one or more electronic documents and/or electronic files, and exist in the form of physical signals and/or physical states, such as memory states. For example, one or more parameters, such as referring to an electronic document and/or an electronic file comprising an image, may include, as examples, time of day at which an image was captured, latitude and longitude of an image capture device, such as a camera, for example, etc. In another example, one or more parameters relevant to digital content, such as digital content comprising a technical article, as an example, may include one or more authors, for example. Claimed subject matter is intended to embrace meaningful, descriptive parameters in any format, so long as the one or more parameters comprise physical signals and/or states, which may include, as parameter examples, collection name (e.g., electronic file and/or electronic document identifier name), technique of creation, purpose of creation, time and date of creation, logical path if stored, coding formats (e.g., type of computer instructions, such as a markup language) and/or standards and/or specifications used so as to be protocol compliant (e.g., meaning substantially compliant and/or substantially compatible) for one or more uses, and so forth.

Signal packet communications and/or signal frame communications, also referred to as signal packet transmissions and/or signal frame transmissions (or merely "signal packets" or "signal frames"), may be communicated between nodes of a network, where a node may comprise one or more network devices and/or one or more computing devices, for example. As an illustrative example, but without limitation, a node may comprise one or more sites employing a local network address, such as in a local network address space. Likewise, a device, such as a network device and/or a computing device, may be associated with that node. It is also noted that in the context of this patent application, the term "transmission" is intended as another term for a type of signal communication that may occur in any one of a variety of situations. Thus, it is not intended to imply a particular directionality of communication and/or a particular initiating end of a communication path for the "transmission" communication. For example, the mere use of the term in and of itself is not intended, in the context of the present patent application, to have particular implications with respect to the one or more signals being communicated, such as, for example, whether the signals are being communicated "to" a particular device, whether the signals are being communicated "from" a particular device, and/or regarding which end of a communication path may be initiating communication, such as, for example, in a "push type" of signal transfer or in a "pull type" of signal transfer. In the context of the present patent application, push and/or pull type signal transfers are distinguished by which end of a communications path initiates signal transfer.

Thus, a signal packet and/or frame may, as an example, be communicated via a communication channel and/or a communication path, such as comprising a portion of the Internet and/or the Web, from a site via an access node coupled to the Internet or vice-versa. Likewise, a signal packet and/or frame may be forwarded via network nodes to a target site coupled to a local network, for example. A signal packet and/or frame communicated via the Internet and/or the Web, for example, may be routed via a path, such as either being "pushed" or "pulled," comprising one or more gateways, servers, etc. that may, for example, route a signal packet and/or frame, such as, for example, substantially in accordance with a target and/or destination address and availability of a network path of network nodes to the target and/or destination address. Although the Internet and/or the Web comprise a network of interoperable networks, not all of those interoperable networks are necessarily available and/or accessible to the public.

In the context of the particular patent application, a network protocol, such as for communicating between devices of a network, may be characterized, at least in part, substantially in accordance with a layered description, such as the so-called Open Systems Interconnection (OSI) seven layer type of approach and/or description. A network computing and/or communications protocol (also referred to as a network protocol) refers to a set of signaling conventions, such as for communication transmissions, for example, as may take place between and/or among devices in a network. In the context of the present patent application, the term "between" and/or similar terms are understood to include "among" if appropriate for the particular usage and vice-versa. Likewise, in the context of the present patent application, the terms "compatible with," "comply with" and/or similar terms are understood to respectively include substantial compatibility and/or substantial compliance.

A network and/or sub-network, in an embodiment, may communicate via signal packets and/or signal frames, such as via participating digital devices and may be substantially compliant and/or substantially compatible with, but is not limited to, now known and/or to be developed, versions of any of the following network protocol stacks: ARCNET, AppleTalk, ATM, Bluetooth, DECnet, Ethernet, FDDI, Frame Relay, HIPPI, IEEE 1394, IEEE 802.11, IEEE-488, Internet Protocol Suite, IPX, Myrinet, OSI Protocol Suite, QsNet, RS-232, SPX, System Network Architecture, Token Ring, USB, and/or X.25. A network and/or sub-network may employ, for example, a version, now known and/or later to be developed, of the following: TCP/IP, UDP, DECnet, NetBEUI, IPX, AppleTalk and/or the like. Versions of the Internet Protocol (IP) may include IPv4, IPv6, and/or other later to be developed versions.

Regarding aspects related to a network, including a communications and/or computing network, a wireless network may couple devices, including client devices, with the network. A wireless network may employ stand-alone, ad-hoc networks, mesh networks, Wireless LAN (WLAN) networks, cellular networks, and/or the like. A wireless network may further include a system of terminals, gateways, routers, and/or the like coupled by wireless radio links, and/or the like, which may move freely, randomly and/or organize themselves arbitrarily, such that network topology may change, at times even rapidly. A wireless network may further employ a plurality of network access technologies, including a version of Long Term Evolution (LTE), WLAN, Wireless Router (WR) mesh, 2nd, 3rd, or 4th generation (2G, 3G, 4G, or 5G) cellular technology and/or the like, whether currently known and/or to be later developed. Network access technologies may enable wide area coverage for devices, such as computing devices and/or network devices, with varying degrees of mobility, for example.

A network may enable radio frequency and/or other wireless type communications via a wireless network access technology and/or air interface, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, ultra-wideband (UWB), 802.11b/g/n, and/or the like. A wireless network may include virtually any type of now known and/or to be developed wireless communication mechanism and/or wireless communications protocol by which signals may be communicated between devices, between networks, within a network, and/or the like, including the foregoing, of course.

Figure 8:
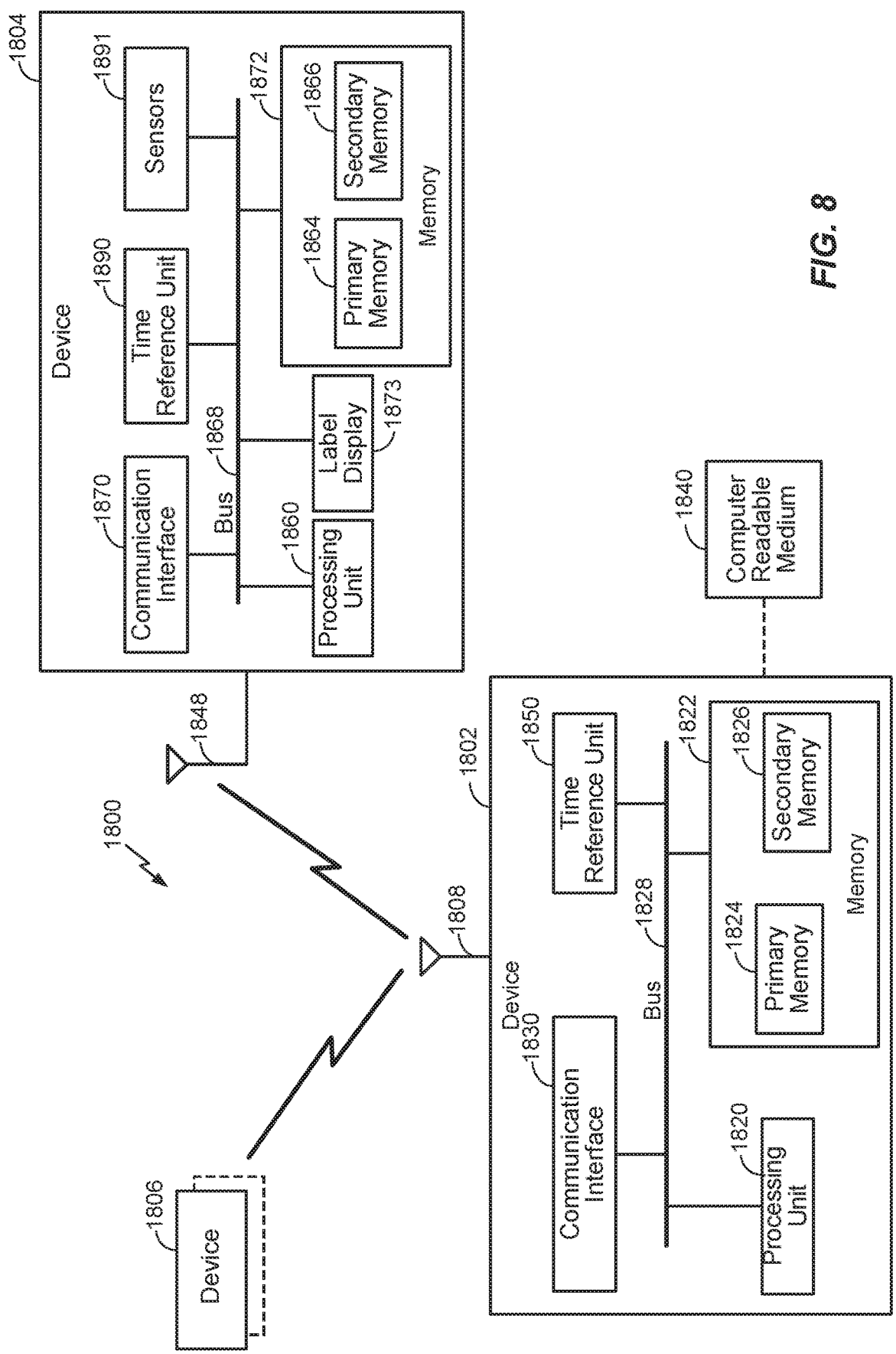
FIG. 8 is a schematic block diagram of an example computing system in accordance with an implementation.

In example embodiments, as shown in FIG. 8, a system embodiment may comprise a local network (e.g., device 1802 and medium 1840) and/or another type of network, such as a computing and/or communications network. For purposes of illustration, therefore, FIG. 8 shows an embodiment 1800 of a system that may be employed to implement either type or both types of networks. A network may comprise one or more network connections, links, processes, services, applications, and/or resources to facilitate and/or support communications, such as an exchange of communication signals, for example, between a computing device, such as device 1802, and another computing device, such as 1804, which may, for example, comprise one or more client computing devices and/or one or more server computing device.

Example devices in FIG. 8 may comprise features, for example, of a computing devices to implement a reader device (e.g., reader device 102, FIG. 1A) and/or a transponder device (e.g., transponder device 104, FIG. 1A), in an embodiment. It is further noted that the term computing device, in general, whether employed as a client and/or as a server, or otherwise, refers at least to a processor and a memory connected by a communication bus. A "processor" or "processing unit," for example, is understood to connote a specific structure such as a central processing unit (CPU) of a computing device which may include a control unit and an execution unit. In an aspect, a processor may comprise a device that interprets and executes instructions to process input signals to provide output signals. As such, in the context of the present patent application at least, computing device and/or processor are understood to refer to sufficient structure within the meaning of 35 USC § 112 (f) so that it is specifically intended that 35 USC § 112 (f) not be implicated by use of the term "computing device," "processor" and/or similar terms; however, if it is determined, for some reason not immediately apparent, that the foregoing understanding cannot stand and that 35 USC § 112 (f), therefore, necessarily is implicated by the use of the term "computing device," "processor" and/or similar terms, then, it is intended, pursuant to that statutory section, that corresponding structure, material and/or acts for performing one or more functions be understood and be interpreted to be described at least in FIGS. 2A, 2B, 2C, 3A, 3B, 4A, 4B, 5, 6 and 7, and in the text associated with the foregoing FIGS. 2A, 2B, 2C, 3A, 3B, 4A, 4B, 5, 6 and 7 of the present patent application.

FIG. 8 is a schematic diagram illustrating an example system 1800 that may include one or more devices configurable to implement techniques or processes described above, for example, in connection with FIGS. 2A, 2B, 2C, 3A, 3B, 4A, 4B, 5, 6 and 7. System 1800 may include, for example, a first device 1802, a second device 1804, and a third device 1806, which may be operatively coupled together through a wireless communications techniques described above.

First device 1802, second device 1804 and third device 1806, as shown in FIG. 8, may be representative of any device, appliance or machine that may be configurable to exchange signals and/or messages over a wireless communications network. By way of example but not limitation, any of first device 1802, second device 1804, or third device 1806 may include: one or more computing devices or platforms, such as, e.g., a desktop computer, a laptop computer, a workstation, a server device, or the like; one or more personal computing or communication devices or appliances, such as, e.g., a personal digital assistant, mobile communication device, or the like; a computing system or associated service provider capability, such as, e.g., a database or data storage service provider/system, a network service provider/system, an Internet or intranet service provider/system, a portal or search engine service provider/system, a wireless communication service provider/system; or any combination thereof. Any of the first, second, and third devices 1802, 1804, and 1806, respectively, may comprise one or more of a reader device or a transponder device in accordance with the examples described herein.

Similarly, a wireless communications network, as shown in FIG. 8, may be representative of one or more communication links, processes, or resources configurable to support the exchange of signals and/or messages between at least two of first device 1802, second device 1804, and third device 1806. By way of example but not limitation, a wireless communications network may include wireless or wired communication links, telephone or telecommunications systems, data buses or channels, optical fibers, terrestrial or space vehicle resources, local area networks, wide area networks, intranets, the Internet, routers or switches, and the like, or any combination thereof. In an embodiment, wireless communication links in a wireless communication link may enable one or more signal messaging formats set forth in one or more ISO/IES 18000 conventions.

It is recognized that all or part of the various devices and networks shown in FIG. 8, and the processes and methods as further described herein, may be implemented using or otherwise including hardware, firmware, software, or any combination thereof.

Thus, by way of example but not limitation, first device 1802 may include at least one processing unit 1820 that is operatively coupled to a memory 1822 through a bus 1828. Likewise, second device 1804 may include at least one processing unit 1860 that is operatively coupled to a memory 1872 through a bus 1868.

Processing unit 1820 and/or processing unit 1860 may be representative of one or more circuits configurable to perform at least a portion of a computing procedure or process. By way of example but not limitation, processing unit 1820 and/or processing unit 1860 may include one or more processors, controllers, microprocessors, microcontrollers, application specific integrated circuits, digital signal processors, programmable logic devices, field programmable gate arrays, and the like, or any combination thereof.

Memory 1822 and/or memory 1872 may be representative of any mechanism for use in storing executable instructions, input/output values, parameters, measurements and/or symbols, etc. Memory 1822 may include, for example, a primary memory 1824 or a secondary memory 1826. Likewise, memory 1872 may include, for example, a primary memory 1864 or a secondary memory 1866. Primary memory 1824 and/or 1864 may include, for example, a random access memory, read only memory, non-volatile memory, etc. While illustrated in this example as being separate from processing unit 1820, it should be understood that all or part of primary memory 1824 may be provided within or otherwise co-located/coupled with processing unit 1820. Likewise, it should be understood that all or part of primary memory 1864 may be provided within or otherwise co-located/coupled with processing unit 1860. In a particular implementation, memory 1822 and processing unit 1820, and/or memory 1872 and processing unit 1860 may be configured to execute one or more aspects of process discussed above in connection with FIGS. 2A, 2B, 2C, 3A, 3B, 4A, 4B, 5, 6 and 7.

Secondary memory 1826 and/or 1866 may include, for example, the same or similar type of memory as primary memory or one or more storage devices or systems, such as, for example, a disk drive, an optical disc drive, a tape drive, a solid state memory drive, etc. In certain implementations, secondary memory 1826 may be operatively receptive of, or otherwise configurable to couple to, a computer-readable medium 1840. Computer-readable medium 1840 may include, for example, any non-transitory medium that can carry or make accessible data, code or instructions for one or more of the devices in system 1800. Computer-readable medium 1840 may also be referred to as a storage medium.

First device 1802 may include a communication interface 1830 and second device 1804 may include a communication interface 1870 that provide for or otherwise supports an operative coupling of first device 1802 and second device 1804 at least through antennas 1808 and 1848. By way of example but not limitation, communication interface 1830 and/or 1870 may include a network interface device or card, a modem, a router, a switch, a transceiver, and the like. In other alternative implementations, communication interface 1830 and/or 1870 may comprise a wired/LAN interface, wireless LAN interface (e.g., IEEE std. 802.11 wireless interface) and/or a wide area network (WAN) air interface. In a particular implementation, communication interface 1830 and/or 1870 may include circuitry to enable an exchange of messages according to one or more signal messaging formats set forth in one or more ISO/IES 18000 conventions. In a particular implementation, antenna 1808 in combination with communication interface 1830, and antenna 1840 in combination with communication interface 1870 may be used to implement transmission and reception of signals as illustrated in FIGS. 1A, 1B, 2A, 2B, 2C, 3A, 3B, 4A, 4B, 5, 6 and 7.

According to an embodiment, second device 1804 may further comprise sensors 1891 which may comprise, for example, a light sensor and/or temperature sensor (e.g., embedded in a smart food label) capable of generating signals representative of measurements and/or observations of particular conditions. In addition, second device 1804 may comprise display label 1873 to display values computed at processing unit 1860. Display label 1873 may comprise, for example, via printed e-ink display. Such values displayed on and/or through display label 1873 may comprise values computed at processing unit 1860 based, at least in part, on signals representative of measurements and/or observations obtained from sensors 1891. Second device 1804 may also comprise circuitry and/or structures (not shown) for collecting and/or harvesting energy and/or power from a signal received at antenna 1848 (e.g., RF signal 110) such as, for example, charge pumps employing Dickson and/or cross-coupled doublers as described in "Power Supply Generation in CMOS Passive UHF RFID Tags," Alessio Facen and Andrea Boni, 2006 Ph.D. Research in Microelectronics and Electronics, IEEE Xplore, 11 Sep. 2006 and/or described in "Self-Biased Differential Rectifier With Enhanced Dynamic Range for Wireless Powering," Mahmoud H. Ouda, Waleed Khalil and Khaled N. Salama, IEEE Transactions on Circuits and Systems II: Express Briefs, Vol. 64, No. 5, May 2017, for example. As pointed out above, such energy collected and/or harvested from a signal received at antenna 1848 may be used for powering subsystems of second device 1804. Such subsystems of second device 1804 may include, for example, communication interface 1870, time reference unit 1890, sensors 1891, processing unit 1860, label display 1873 and/or memory 1872. It should be understood, however, that these are merely examples of subsystems of a device that may be powered based, at least in part, from energy harvested and/or collected from an RF signal received at an antenna, and claimed subject matter is not limited in this respect.

As suggested previously, communications between a computing device and/or a network device and a wireless network may be in accordance with known and/or to be developed network protocols including, for example, global system for mobile communications (GSM), enhanced data rate for GSM evolution (EDGE), 802.11b/g/n/h, etc., and/or worldwide interoperability for microwave access (WiMAX). A computing device and/or a networking device may also have a subscriber identity module (SIM) card, which, for example, may comprise a detachable or embedded smart card that is able to store subscription content of a user, and/or is also able to store a contact list. It is noted, however, that a SIM card may also be electronic, meaning that is may simply be stored in a particular location in memory of the computing and/or networking device. A user may own the computing device and/or network device or may otherwise be a user, such as a primary user, for example. A device may be assigned an address by a wireless network operator, a wired network operator, and/or an Internet Service Provider (ISP). For example, an address may comprise a domestic or international telephone number, an Internet Protocol (IP) address, and/or one or more other identifiers. In other embodiments, a computing and/or communications network may be embodied as a wired network, wireless network, or any combinations thereof.

A computing and/or network device may include and/or may execute a variety of now known and/or to be developed operating systems, derivatives and/or versions thereof, including computer operating systems, such as Windows, iOS, Linux, a mobile operating system, such as iOS, Android, Windows Mobile, and/or the like. A computing device and/or network device may include and/or may execute a variety of possible applications, such as a client software application enabling communication with other devices. For example, one or more messages (e.g., content) may be communicated, such as via one or more protocols, now known and/or later to be developed, suitable for communication of email, short message service (SMS), and/or multimedia message service (MMS), including via a network, such as a social network, formed at least in part by a portion of a computing and/or communications network, including, but not limited to, Facebook, LinkedIn, Twitter, and/or Flickr, to provide only a few examples. A computing and/or network device may also include executable computer instructions to process and/or communicate digital content, such as, for example, textual content, digital multimedia content, and/or the like. A computing and/or network device may also include executable computer instructions to perform a variety of possible tasks, such as browsing, searching, playing various forms of digital content, including locally stored and/or streamed video, and/or games such as, but not limited to, fantasy sports leagues. The foregoing is provided merely to illustrate that claimed subject matter is intended to include a wide range of possible features and/or capabilities.

In FIG. 8, first device 1802 and/or second device 1804 may provide one or more sources of executable computer instructions in the form physical states and/or signals (e.g., stored in memory states), for example. First device 1802 may communicate with second device 1804 by way of a network connection, such as by uplink and downlink signals (e.g., uplink signal 122 and downlink signal 124, FIG. 1A), for example. As previously mentioned, a connection, while physical, may not necessarily be tangible. Although first and second devices 1802 and 1804 of FIG. 8 show various tangible, physical components, claimed subject matter is not limited to a computing devices having only these tangible components as other implementations and/or embodiments may include alternative arrangements that may comprise additional tangible components or fewer tangible components, for example, that function differently while achieving similar results. Rather, examples are provided merely as illustrations. It is not intended that claimed subject matter be limited in scope to illustrative examples.

Memory 1822 and/or 1872 may comprise any non-transitory storage mechanism. Memory 1822/1872 may comprise, for example, primary memory 1824/1864 and secondary memory 1826/1866, additional memory circuits, mechanisms, or combinations thereof may be used. Memory 1822 and/or memory 1872 may comprise, for example, random access memory, non-volatile memory, read only memory, etc., such as in the form of one or more storage devices and/or systems, such as, for example, a disk drive including an optical disc drive, a tape drive, a solid-state memory drive, etc., just to name a few examples.

Memory 1822 and/or 1872 may be utilized to store a program of executable computer instructions. For example, processor 1820 and/or processor 1860 may fetch executable instructions from memory and proceed to execute the fetched instructions. Memory 1822 may also comprise a memory controller for accessing device readable-medium 640 that may carry and/or make accessible digital content, which may include code, and/or instructions, for example, executable by processor 1820 and/or some other device, such as a controller, as one example, capable of executing computer instructions, for example. Under direction of processor 1820, a non-transitory memory, such as memory cells storing physical states (e.g., memory states), comprising, for example, a program of executable computer instructions, may be executed by processor 1820 and able to generate signals to be communicated via a network, for example, as previously described. Generated signals may also be stored in memory, also previously suggested.

Memory 1822 may store electronic files and/or electronic documents, such as relating to one or more users, and may also comprise a computer-readable medium that may carry and/or make accessible content, including code and/or instructions, for example, executable by processor 1820 and/or some other device, such as a controller, as one example, capable of executing computer instructions, for example. As previously mentioned, the term electronic file and/or the term electronic document are used throughout this document to refer to a set of stored memory states and/or a set of physical signals associated in a manner so as to thereby form an electronic file and/or an electronic document. That is, it is not meant to implicitly reference a particular syntax, format and/or approach used, for example, with respect to a set of associated memory states and/or a set of associated physical signals. It is further noted an association of memory states, for example, may be in a logical sense and not necessarily in a tangible, physical sense. Thus, although signal and/or state components of an electronic file and/or electronic document, are to be associated logically, storage thereof, for example, may reside in one or more different places in a tangible, physical memory, in an embodiment.

Algorithmic descriptions and/or symbolic representations are examples of techniques used by those of ordinary skill in the signal processing and/or related arts to convey the substance of their work to others skilled in the art. An algorithm is, in the context of the present patent application, and generally, is considered to be a self-consistent sequence of operations and/or similar signal processing leading to a desired result. In the context of the present patent application, operations and/or processing involve physical manipulation of physical quantities. Typically, although not necessarily, such quantities may take the form of electrical and/or magnetic signals and/or states capable of being stored, transferred, combined, compared, processed and/or otherwise manipulated, for example, as electronic signals and/or states making up components of various forms of digital content, such as signal measurements, text, images, video, audio, etc.

It has proven convenient at times, principally for reasons of common usage, to refer to such physical signals and/or physical states as bits, values, elements, parameters, symbols, characters, terms, numbers, numerals, measurements, content and/or the like. It should be understood, however, that all of these and/or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically in the form of physical electronic and/or magnetic quantities, within memories, registers, and/or other storage devices, processing devices, and/or display devices of the special purpose computer and/or similar special purpose computing and/or network device. In the context of this particular patent application, as mentioned, the term "specific apparatus" therefore includes a general purpose computing and/or network device, such as a general purpose computer, once it is programmed to perform particular functions, such as pursuant to program software instructions.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation. Likewise, a physical change may comprise a transformation in molecular structure, such as from crystalline form to amorphous form or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state from a binary one to a binary zero or vice-versa in a memory device may comprise a transformation, such as a physical, but non-transitory, transformation. Rather, the foregoing is intended as illustrative examples.

Referring again to FIG. 8, processor 1820 and/or 1860 may comprise one or more circuits, such as digital circuits, to perform at least a portion of a computing procedure and/or process. By way of example, but not limitation, processor 1820 and/or 1860 may comprise one or more processors, such as controllers, microprocessors, microcontrollers, application specific integrated circuits, digital signal processors, programmable logic devices, field programmable gate arrays, the like, or any combination thereof. In various implementations and/or embodiments, processor 1820 and/or 1860 may perform signal processing, typically substantially in accordance with fetched executable computer instructions, such as to manipulate signals and/or states, to construct signals and/or states, etc., with signals and/or states generated in such a manner to be communicated and/or stored in memory, for example.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of the appended claims, and equivalents thereof.

What is claimed is:

1. A method at a transponder device, comprising:
collecting and/or harvesting energy and/or power from a received incident power signal;
generating one or more signals from sensing circuitry responsive to one or more physical conditions;
performing computing operations to process the one or more signals generated by the sensing circuitry;
determining an availability of energy and/or power collectable and/or harvestable from the received incident power signal based, at least in part, on an expected intensity and/or duration of a pulse of the received incident power signal; and
varying the computing operations to be performed to process the one or more signals generated by the sensing circuitry and/or varying operations to generate the one or more signals from the sensing circuitry based, at least in part, on the determined availability of energy and/or power collectable and/or harvestable from the received incident power signal to power the computing operations and/or the operations to generate the one or more signals from the sensing circuitry.

2. The method of claim 1, and further comprising displaying on a label one or more computational results based, at least in part, on the computing operations.

3. The method of claim 1, wherein varying the operations to generate the one or more signals from the sensing circuitry comprises varying a number of observations and/or rate of observations to be obtained from the sensing circuitry over a duration.

4. The method of claim 1, wherein varying the computing operations to be performed to process the one or more signals generated by the sensing circuitry and/or the operations to generate the one or more signals from the sensing circuitry comprises selecting one or more algorithms to be applied in processing the one or more signals generated by the sensing circuitry based, at least in part, on the availability of energy and/or power collectable and/or harvestable from the received incident power signal.

5. The method of claim 1, wherein varying computing operations to be performed to process the one or more signals generated by the sensing circuitry and/or the operations to generate the one or more signals from the sensing circuitry comprises varying a cyclic redundancy check, varying a number of iterations of a processing loop, varying a processor vector-length, selecting between use of fixed-point operations and use of floating-point operations or selecting between use of multi-cycle operations and use of single-cycle accelerated operations, or a combination thereof.

6. The method of claim 1, wherein varying computing operations to be performed to process the one or more signals generated by the sensing circuitry and/or the operations to generate the one or more signals from the sensing circuitry further comprises:
storing in a non-volatile memory device observations, samples and/or measurements obtained based, at least in part, on the one or more signals generated by the sensing circuitry powered by energy collected and/or harvested from a first pulse of the received incident power signal; and
powered by energy collected and/or harvested from a second pulse of the received incident power signal, performing computing operations to process the stored observations, samples and/or measurements and to process observations, samples and/or measurements obtained based, at least in part, on the one or more signals generated by the sensing circuitry powered by the energy collected and/or harvested from the second pulse of the received incident power signal.

7. The method of claim 6, and further comprising storing in the non-volatile memory device at least partial computations based, at least in part, on the observations, samples and/or measurements, and/or a processor state.

8. The method of claim 1, wherein:
the operations to generate the one or more signals by the sensing circuitry comprise obtaining observations, samples and/or measurements contemporaneously with receipt of respective pulses of the received incident power signal powered by energy and/or power collected and/or harvested from the received respective pulses, and wherein the method further comprises:
obtaining a message from an initial pulse of the received incident power signal, the message comprising an indication of a number of observations, samples and/or measurements to be obtained from the one or more signals generated by the sensing circuitry over a subsequent duration; and
varying, over one or more pulses of the received incident power signal to be received over the subsequent duration, the computing operations to be performed and/or the operations to generate the one or more signals from the sensing circuitry based, at least in part, on the indication of the number and an expected availability of collectable and/or harvestable energy and/or power to be incident from receipt of one or more pulses of the received incident power signal transmitted over the subsequent duration.

9. The method of claim 8, wherein the indication of the number of observations, samples and/or measurements to be obtained from the one or more signals generated by the sensing circuitry over the subsequent duration specifies an average number of observations, samples and/or measurements to be obtained and/or a minimum number of observations, samples and/or measurements to be obtained contemporaneously with receipt per pulse of the received incident power signal.

10. A transponder device comprising:
circuitry to collect and/or harvest energy and/or power from a received incident power signal;
sensing circuitry to generate one or more signals responsive to one or more physical conditions;
one or more processors to perform computing operations to process the one or more signals generated by the sensing circuitry and determine an availability of energy and/or power collectable and/or harvestable from the received incident power signal based, at least in part, on an expected intensity and/or duration of a pulse of the received incident power signal; and
circuitry to vary the computing operations to be performed by the one or more processors to process the one or more signals generated by the sensing circuitry and/or the operations to generate the one or more signals from the sensing circuitry based, at least in part, on the determined availability of energy and/or power collectable and/or harvestable from the received incident power signal to power the computing operations and/or the operations to generate the one or more signals from the sensing circuitry.

11. The transponder device of claim 10, and further comprising a display device formed on a label, and wherein the one or more processors are further to initiate display of a computing result on the display device determined, at least in part, based on the computing operations.

12. The transponder device of claim 10, wherein the circuitry to vary computing operations to be performed by the one or more processors to process the one or more signals generated by the sensing circuitry and/or the operations to generate the one or more signals from the sensing circuitry to vary a number of observations and/or rate of observations to be obtained from the sensing circuitry over a duration.

13. The transponder device of claim 10, wherein the circuitry to vary computing operations to be performed by the one or more processors to process the one or more signals generated by the sensing circuitry and/or the operations to generate the one or more signals from the sensing circuitry to select one or more algorithms to be applied in processing the one or more signals generated by the sensing circuitry based, at least in part, on the availability of energy and/or power collected and/or harvested from the received incident power signal.

14. The transponder device of claim 10, wherein the circuitry to vary computing operations to be performed by the one or more processors to process the one or more signals generated by the sensing circuitry and/or the operations to generate the one or more signals from the sensing circuitry to vary a cyclic redundancy check, vary a number of iterations of a processing loop, vary a processor vector-length, select between use of fixed-point operations and use of floating-point operations or select between use of multi-cycle operations and use of single-cycle accelerated operations, or a combination thereof.

15. The transponder device of claim 10, and further comprising a non-volatile memory device, and wherein the one or more processors are further to:
  store in the non-volatile memory device observations, samples and/or measurements obtained based, at least in part, on the one or more signals generated by the sensing circuitry powered by energy collected and/or harvested from a first pulse of the received incident power signal; and
  powered by energy collected and/or harvested from a second pulse of the received incident power signal, perform computing operations to process the stored observations, samples and/or measurements and to process observations, samples and/or measurements obtained based, at least in part, on the one or more signals generated by the sensing circuitry powered by the energy collected and/or harvested from the second pulse of the received incident power signal.

16. The transponder device of claim 10, wherein:
  operations to generate the one or more signals by the sensing circuitry comprise operations to obtain observations, samples and/or measurements contemporaneously with receipt of respective pulses of the received incident power signal powered by energy and/or power collected and/or harvested from the received respective pulses, and wherein:
  the one or more processors are further to obtain a message from an initial pulse of the received incident power signal, the message to include an indication of a number of observations, samples and/or measurements to be obtained from the one or more signals generated by the sensing circuitry over a subsequent duration; and
  circuitry to vary computing operations to be performed by the one or more processors to process the one or more signals generated by the sensing circuitry and/or the operations to generate the one or more signals from the sensing circuitry to vary, over one or more pulses of the received incident power signal to be received over the subsequent duration, the computations to be performed and/or the operations to generate the one or more signals from the sensing circuitry based, at least in part, on the indication of the number of observations, samples and/or measurements to be obtained from the one or more signals generated by the sensing circuitry over a subsequent duration and an expected availability of collectable and/or harvestable energy and/or power to be incident from receipt of one or more pulses of the received incident power signal transmitted over the subsequent duration.

17. The transponder device of claim 16, wherein the indication of the number of observations, samples and/or measurements to be obtained from the one or more signals generated by the sensing circuitry over the subsequent duration to specify an average number of observations, samples and/or measurements to be obtained and/or a minimum number of observations, samples and/or measurements to be obtained contemporaneously with receipt per pulse of the received incident power signal.

18. A device comprising:
  a transmitter to transmit a power signal; and
  one or more processors to:
  control the transmitter to transmit the power signal to be incident at a transponder device to provide collectable and/or harvestable energy and/or power at the transponder device, the power signal to comprise a series of scheduled pulses; and
  selectively pre-terminate transmission of a scheduled pulse in the series of scheduled pulses responsive at least in part to a determination that collectable and/or harvestable energy and/or power from the scheduled pulse to be incident at the transponder device to be insufficient for the transponder device to achieve a particular computing result.

* * * * *